United States Patent
Masurekar et al.

(10) Patent No.: US 10,230,629 B2
(45) Date of Patent: *Mar. 12, 2019

(54) STATIC ROUTE CONFIGURATION FOR LOGICAL ROUTER

(71) Applicant: Nicira, Inc., Palo Alto, CA (US)

(72) Inventors: Uday Masurekar, Sunnyvale, CA (US); Abhishek Goliya, Pune (IN)

(73) Assignee: NICIRA, INC., Palo Alto, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/871,968

(22) Filed: Sep. 30, 2015

(65) Prior Publication Data

US 2017/0048129 A1    Feb. 16, 2017

(30) Foreign Application Priority Data

Aug. 11, 2015   (IN) .......................... 4183/CHE/2015

(51) Int. Cl.

| | |
|---|---|
| *H04L 12/741* | (2013.01) |
| *H04L 12/713* | (2013.01) |
| *H04L 12/715* | (2013.01) |
| *H04L 12/931* | (2013.01) |
| *H04L 12/721* | (2013.01) |
| *H04L 12/717* | (2013.01) |

(52) U.S. Cl.
CPC .......... *H04L 45/586* (2013.01); *H04L 45/54* (2013.01); *H04L 45/64* (2013.01); *H04L 49/354* (2013.01); *H04L 49/70* (2013.01); *H04L 45/42* (2013.01); *H04L 45/44* (2013.01); *H04L 45/74* (2013.01)

(58) Field of Classification Search
None
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |
| 5,751,967 A | 5/1998 | Raab et al. |
| 6,006,275 A | 12/1999 | Picazo, Jr. et al. |
| 6,104,699 A | 8/2000 | Holender et al. |
| 6,219,699 B1 | 4/2001 | McCloghrie et al. |

(Continued)

FOREIGN PATENT DOCUMENTS

| | | |
|---|---|---|
| EP | 1653688 | 5/2006 |
| EP | 3013006 A1 | 4/2016 |

(Continued)

OTHER PUBLICATIONS

VMware® NSX Network Virtualization Design Guide, 2013.*

(Continued)

*Primary Examiner* — Vinncelas Louis
(74) *Attorney, Agent, or Firm* — Adeli LLP

(57) ABSTRACT

Some embodiments provide a method for implementing a logical router in a logical network. In some embodiments, the method receives a configuration of a static route for the logical router, which includes several routing components with separate routing tables. The method identifies which of the routing components require addition of a route to a corresponding routing table to implement the configuration of the static route. The method adds the routes to the corresponding separate routing tables of the identified routing components.

19 Claims, 16 Drawing Sheets

(56) References Cited

U.S. PATENT DOCUMENTS

| | | |
|---|---|---|
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,914,907 B1 | 7/2005 | Bhardwaj et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,958,298 B2 | 2/2015 | Zhang et al. |
| 9,021,066 B1 | 4/2015 | Singh et al. |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 * | 11/2016 | Traina .................... H04L 29/06 |
| 9,503,321 B2 | 11/2016 | Neginhal et al. |
| 9,647,883 B2 | 5/2017 | Neginhal et al. |
| 9,787,605 B2 | 10/2017 | Zhang et al. |
| 10,057,157 B2 | 8/2018 | Goliya et al. |
| 10,075,363 B2 | 9/2018 | Goliya et al. |
| 10,079,779 B2 | 9/2018 | Zhang et al. |
| 2001/0043614 A1 | 11/2001 | Viswanadham et al. |
| 2002/0067725 A1 | 6/2002 | Oguchi et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | de Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |

(56) References Cited

U.S. PATENT DOCUMENTS

| | | |
|---|---|---|
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1* | 2/2013 | Koponen ............... H04L 47/12 370/254 |
| 2013/0044641 A1 | 2/2013 | Koponen et al. |
| 2013/0051399 A1 | 2/2013 | Zhang et al. |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0146817 A1 | 5/2014 | Zhang |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0016300 A1 | 1/2015 | Devireddy et al. |
| 2015/0063360 A1 | 3/2015 | Thakkar et al. |
| 2015/0089082 A1 | 3/2015 | Patwardhan et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2016/0105471 A1 | 4/2016 | Nunes et al. |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0261493 A1 | 9/2016 | Li |
| 2016/0294612 A1 | 10/2016 | Ravinoothala et al. |
| 2016/0344586 A1 | 11/2016 | Ganichev et al. |
| 2017/0048130 A1 | 2/2017 | Goliya et al. |
| 2017/0063632 A1 | 3/2017 | Goliya et al. |
| 2017/0063633 A1 | 3/2017 | Goliya et al. |
| 2017/0064717 A1 | 3/2017 | Filsfils et al. |
| 2017/0126497 A1 | 5/2017 | Dubey et al. |
| 2017/0230241 A1 | 8/2017 | Neginhal et al. |
| 2017/0317919 A1 | 11/2017 | Fernando et al. |
| 2018/0006943 A1 | 1/2018 | Dubey |
| 2018/0062914 A1 | 3/2018 | Boutros et al. |
| 2018/0097734 A1 | 4/2018 | Boutros et al. |

FOREIGN PATENT DOCUMENTS

| | | |
|---|---|---|
| JP | 2003069609 | 3/2003 |
| JP | 2003124976 | 4/2003 |
| JP | 2003318949 | 11/2003 |
| WO | 2005112390 | 11/2005 |
| WO | 2008095010 | 8/2008 |
| WO | 2013184846 | 12/2013 |
| WO | PCT/US2016/025699 | 4/2016 |
| WO | 2017027073 | 2/2017 |

OTHER PUBLICATIONS

Published commonly owned U.S. Appl. No. 14/222,557.
Published commonly owned U.S. Appl. No. 13/589,078.
International Search Report and Written Opinion of PCT/US2016/025699, dated Jul. 14, 2016, Nicira, Inc.
Fernando, Cisco, R., et al., "Service Chaining using Virtual Networks with BGP," Internet Engineering Task Force, IETF, Jul. 7, 2015, pp. 1-32, Internet Society (ISOC), Geneva, Switzerland, available at https://tools.ietf.org/html/draft-fm-bess-service-chaining-01.
Aggarwal, R. et al., "Data Center Mobility based on E-VPN, BGP/MPLS IP VPN, IP Routing and NHRP; draft-raggarwa-data-

(56) References Cited

OTHER PUBLICATIONS center-mobility-05.txt," Jun. 10, 2013, 24 pages, Internet Engineering Task Force, IETF, Standardworkingdraft, Internet Society (ISOC) 4, Rue Des Falaises CH-1205, Geneva, Switzerland.

Ballani, Hitesh, et al., "Making Routers Last Longer with ViAggre," NSDI '09: 6th USENIX Symposium on Networked Systems Design and Implementation, Apr. 2009, 14 pages, USENIX Association.

Caesar, Matthew, et al., "Design and Implementation of a Routing Control Platform," NSDI '05: 2nd Symposium on Networked Systems Design & Implementation, Apr. 2005, 14 pages, USENIX Association.

Dobrescu, Mihai, et al., "RouteBricks: Exploiting Parallelism to Scale Software Routers," SOSP '09, Proceedings of the ACM SIGOPS 22nd Symposium on Operating Systems Principles, Oct. 2009, 17 pages, ACM New York, NY.

Dumitriu, Dan Mihai, et al. (U.S. Appl. No. 61/514,990), "Method and Apparatus for Computing", filed Aug. 4, 2011, 31 pages.

Handley, Mark, et al., "Designing Extensible IP Router Software," Proc. of NSDI, May 2005, 14 pages.

Kim, Changhoon, et al., "Revisiting Route Caching: The World Should be Flat," in Proc. of PAM, Month Unknown, 10 pages.

Koponen, Teemu, et al., "Network Virtualization in Multi-tenant Datacenters," Technical Report TR-2013-001E, International Computer Science Institute & UC Berkeley, Aug., 2013, 22 pages, VMware, Inc., Palo Alto, CA, USA.

Lakshminarayanan, Karthik, et al., "Routing as a Service," Month Unknown, 2004, 15 pages, Berkeley, California.

Maltz, David A., et al., "Routing Design in Operational Networks: A Look from the Inside," SIGCOMM '04, Aug. 30-Sep. 3, 2004, 14 pages, ACM, Portland, Oregon, USA.

Pelissier, Joe, "Network Interface Virtualization Review," Jan. 2009, 38 pages.

Rosen, E., et al., "Applicability Statement for BGPMPLS IP Virtual Private Networks (VPNs)," The Internet Society, RFC 4365, Feb. 2006, 32 pages.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 2013, 15 pages, IEEE.

Wang, Yi, et al., "Virtual Routers on the Move: Live Router Migration as a Network-management Primitive," SIGCOMM 08, Aug. 17-22, 2008, 12 pages, ACM, Seattle, Washington, USA.

Sajassi, Ali, et al., "Integrated Routing and Bridging in EVPN draft-sajassi-l2vpn-evpn-inter-subnet-forwarding-04", Jul. 4, 2014, 24 pages.

\* cited by examiner

STATIC ROUTE CONFIGURATION FOR LOGICAL ROUTER

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine.

In logical networks, user-defined data compute nodes (e.g., virtual machines) on different subnets may need to communicate with each other as well. In this case, tenants may define a network for virtualization that includes both logical switches and logical routers. Methods for implementing the logical routers to adequately serve such virtualized logical networks in datacenters are needed.

BRIEF SUMMARY

Some embodiments provide a method for implementing a logical router in a network (e.g., in a datacenter). In some embodiments, the method is performed by a management plane that centrally manages the network (e.g., implemented in a network controller). The method, in some embodiments, receives a definition of a logical router (e.g., through an application programming interface (API) and defines multiple routing components for the logical router. Each of these routing components is separately assigned a set of routes and a set of logical interfaces. The method may also receive specifications of routes for the logical router as well as connections of the logical router to other logical routers. Some embodiments automatically identify to which routing components' routing tables the received routes should be pushed, as well as how to propagate routes based on the connections with other logical routers.

In some embodiments, the several routing components defined for a logical router includes one distributed routing component and several centralized routing components. In addition, the management plane of some embodiments defines a logical switch for handling communications between the components internal to the logical router (referred to as a transit logical switch). The distributed routing component and the transit logical switch are implemented in a distributed manner by numerous machines within the datacenter, while the centralized routing components are each implemented on a single machine. Some embodiments implement the distributed components in the datapath of managed forwarding elements on the various machines, while the centralized routing components are implemented in VMs (or other data compute nodes) on their single machines. Other embodiments also implement the centralized components in the datapath of their assigned machine.

The centralized components, in some embodiments, may be configured in active-active or active-standby modes. In active-active mode, all of the centralized components are fully functional at the same time, and traffic can ingress or egress from the logical network through the centralized components using equal-cost multi-path (ECMP) forwarding principles (balancing the traffic across the various centralized components), so long as the connectivity of the centralized components to the external networks is the same across the components. In this mode, each of the separate centralized components has its own network layer (e.g., IP) address and data link layer (e.g., MAC) address for communicating with an external network. In addition, each of the separate centralized components has its own network layer and data link layer address for connecting to the transit logical switch in order to send packets to and receive packets from the distributed routing component.

In some embodiments, the logical router is part of a two-tier logical network structure. The two-tier structure of some embodiments includes a single logical router for connecting the logical network to a network external to the datacenter (referred to as a provider logical router (PLR) and administrated by, e.g., the owner of the datacenter), and multiple logical routers that connect to the single logical router and do not separately communicate with the external network (referred to as tenant logical routers (TLRs) and administrated by, e.g., different tenants of the datacenter). Some embodiments implement the PLR in active-active mode whenever possible, and only use active-standby mode when stateful services (e.g., NAT, firewall, load balancer, etc.) are configured for the logical router.

For the PLR, some embodiments enable route exchange with the external network. Each of the centralized components of the PLR runs a dynamic routing protocol process to advertise prefixes of the logical network and receive routes towards the external network. Through a network control system of network controllers located both centrally in the datacenter and on the machines that implement the logical network, these routes are propagated to the other centralized components and the distributed routing component. Some embodiments use different administrative metrics in the routing information base (RIB) of the centralized component for routes learned directly from the external network and routes learned from a different peer centralized component that learned the routes from the external network. Thus, a centralized component will prefer routes that it learned directly to routes that involve redirection through peer centralized components of the logical router.

When the logical router is a TLR, some embodiments either use no centralized components or two centralized components in active-standby mode when stateful services are configured for the logical router. Each of these two centralized components has the same network layer address, and only the active component responds to ARP requests. To connect to the PLR, some embodiments also assign each of the two components a same network layer address (though different from the address used to connect to its own distributed component. In addition, the management plane defines a transit logical switch between the distributed component of the PLR and the centralized components of the TLR.

The management plane of some embodiments additionally configures the routing tables for each of the logical router constructs (e.g., for the distributed component as well as for each centralized component). The routes in these routing tables may include routes based on connected logical switches, user-entered static routes, and dynamic routes based on the connection of other logical routers. For instance, any logical switch connected directly to the logical router by an administrator will result in a connected route in the routing table of the distributed component, as well as routes for the various centralized components with the next hop being an interface of the distributed component.

When a user adds a static route, some embodiments provide various rules for adding the static route to the various logical router components. For example, some embodiments add downward-facing static routes (with next hops in the logical network) directly to the distributed component (which interfaces with the other logical forwarding elements, such as the specified next hop), while adding routes to each of the centralized components that, again, point to the interface of the distributed component reachable by the centralized components. When the configured static route is upward-facing (with a next hop in the external network and/or specifying a particular output interface that correlates to one of the centralized components), some embodiments (i) add the route to one or more of the centralized components, depending on the specified interface and/or next hop address and (ii) add routes to the distributed component specifying interfaces of each of the centralized components as next hops. However, some embodiments do not add the routes to the distributed component when the configured static route is a default route, as the management plane already automatically creates equal-cost default routes for the distributed component routing table pointing to each of the centralized components upon creation of the logical router.

Furthermore, when a TLR is connected to a PLR, some embodiments identify any logical switch subnets that are connected to the TLR and which should be advertised (via dynamic routing protocols) to the external network. In this case, rather than running a dynamic routing protocol between the two logical routers, the management plane (which is aware of both logical router configurations) automatically performs the route exchange while handling the fact that the PLR actually has separate routing tables for each of its separate routing components. Thus, the management plane adds routes for these logical networks to both (i) the distributed routing component, with a next hop as the interface of the TLR that connects to the PLR, and (ii) each of the centralized routing components, with a next hop as the interface of the distributed component that is reachable from the centralized component.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 2:
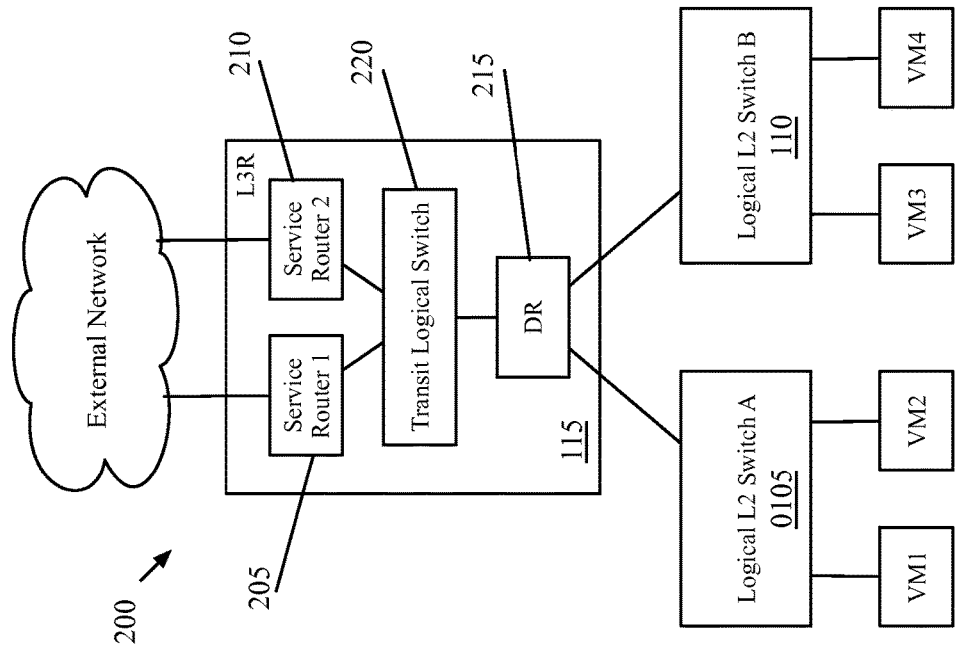
FIG. 2 illustrates a management plane view of the logical network of FIG. 1 when the logical router is implemented in a distributed manner.

Some embodiments provide a method for implementing a logical router in a network (e.g., in a datacenter). In some embodiments, the method is performed by a management plane that centrally manages the network (e.g., implemented in a network controller). The method, in some embodiments, receives a definition of a logical router (e.g., through an application programming interface (API) and defines multiple routing components for the logical router. Each of these routing components is separately assigned a set of routes and a set of logical interfaces. The method may also receive specifications of routes for the logical router as well as connections of the logical router to other logical routers. Some embodiments automatically identify to which routing components' routing tables the received routes should be pushed, as well as how to propagate routes based on the connections with other logical routers.

In some embodiments, the several routing components defined for a logical router includes one distributed routing component (referred to herein as a distributed router, or DR) and several centralized routing components (referred to herein as service routers, or SRs). In addition, the management plane of some embodiments defines a logical switch for handling communications between the components internal to the logical router (referred to as a transit logical switch). The DR and the transit logical switch are implemented in a distributed manner by numerous machines within the datacenter, while the SRs are each implemented on a single machine. Some embodiments implement the DR and transit logical switch in the datapath of managed forwarding elements (MFEs) on the various machines, while the SRs are implemented in VMs (or other data compute nodes) on their single machines. Other embodiments also implement the centralized components in the datapath of their assigned machine.

The SRs, in some embodiments, may be configured in active-active or active-standby modes. In active-active mode, all of the SRs are fully functional at the same time, and traffic can ingress or egress from the logical network through the SRs using equal-cost multi-path (ECMP) forwarding principles (balancing the traffic across the various SRs), so long as the connectivity of the centralized components to the external networks is the same across the components. In this mode, each of the separate SRs has its own network layer (e.g., IP) address and data link layer (e.g., MAC) address for communicating with an external network. In addition, each of the separate SRs has its own network layer and data link layer address for connecting to the transit logical switch in order to send packets to and receive packets from the distributed routing component.

In some embodiments, the logical router is part of a two-tier logical network structure. The two-tier structure of some embodiments includes a single logical router for connecting the logical network to a network external to the datacenter (referred to as a provider logical router (PLR) and administrated by, e.g., the owner of the datacenter), and multiple logical routers that connect to the single logical router and do not separately communicate with the external network (referred to as tenant logical routers (TLRs) and administrated by, e.g., different tenants of the datacenter). Some embodiments implement the SRs of the PLR in active-active mode whenever possible, and only use active-standby mode when stateful services (e.g., NAT, firewall, load balancer, etc.) are configured for the logical router. The discussion herein primarily describes the active-active mode for the PLR.

For the PLR, some embodiments enable route exchange with the external network. Each of the SRs of the PLR runs a dynamic routing protocol process to advertise prefixes of the logical network and receive routes towards the external network. Through a network control system of network controllers located both centrally in the datacenter and on the machines that implement the logical network, these routes are propagated to the other SRs and the DR. Some embodiments use different administrative metrics in the routing information base (RIB) of the centralized component for routes learned directly from the external network and routes learned from a different peer SR that learned the routes from the external network. Thus, a SR will prefer routes that it learned directly to routes that involve redirection through peer SRs of the logical router.

When the logical router is a TLR, some embodiments either use no SRs or two SRs in active-standby mode when stateful services are configured for the logical router. Each of these two SRs has the same network layer address, and only the active component responds to ARP requests. To connect to the PLR, some embodiments also assign each of the two SRs a same network layer address (though different from the address used to connect to its own DR. In addition, the management plane defines a transit logical switch between the DR of the PLR and the SRs of the TLR.

The management plane of some embodiments additionally configures the routing tables for each of the logical router constructs (e.g., for the DR as well as for each SR). The routes in these routing tables may include routes based on connected logical switches, user-entered static routes, and dynamic routes based on the connection of other logical routers. For instance, any logical switch connected directly to the logical router by an administrator will result in a connected route in the routing table of the DR, as well as routes for the various SRs with the next hop being an interface of the DR.

When a user adds a static route, some embodiments provide various rules for adding the static route to the various logical router components. For example, some embodiments add downward-facing static routes (with next hops in the logical network) directly to the DR (which interfaces with the other logical forwarding elements, such as the specified next hop), while adding routes to each of the SRs that, again, point to the interface of the DR reachable by the SRs. When the configured static route is upward-facing (with a next hop in the external network and/or specifying a particular output interface that correlates to one of the SRs), some embodiments (i) add the route to one or more of the SRs, depending on the specified interface and/or next hop address and (ii) add routes to the DR specifying interfaces of each of the centralized components as next hops. However, some embodiments do not add the routes to the DR when the configured static route is a default route, as the management plane already automatically creates equal-cost default routes for the DR routing table pointing to each of the SRs upon creation of the logical router.

Furthermore, when a TLR is connected to a PLR, some embodiments identify any logical switch subnets that are connected to the TLR and which should be advertised (via dynamic routing protocols) to the external network. In this case, rather than running a dynamic routing protocol between the two logical routers, the management plane (which is aware of both logical router configurations) automatically performs the route exchange while handling the fact that the PLR actually has separate routing tables for each of its separate routing components. Thus, the management plane adds routes for these logical networks to both (i) the DR, with a next hop as the interface of the TLR that connects to the PLR, and (ii) each of the SRs, with a next hop as the interface of the DR that is reachable from the SRs.

The above introduces the concept of a two-tiered logical router configuration as well as certain aspects of the logical router configuration and implementation of some embodiments. In the following, Section I focuses on the overall high-level design of the logical router of some embodiments, while Section II describes the configuration of the various logical router components. Section III then describes the routing table configuration for these logical router components. Finally, Section IV describes the electronic system with which some embodiments of the invention are implemented.

I. Logical Router and Physical Implementation

The following discussion describes the design of logical routers for some embodiments as well as the implementation of such logical routers by the network controllers of some embodiments. Logical routers, in some embodiments, exist in three different forms. The first of these forms is the API view, or configuration view, which is how the logical router is defined by a user (e.g., a datacenter provider or tenant). The second view is the control plane, or management plane, view, which is how the network controller internally defines the logical router. Finally, the third view is the physical realization, or implementation of the logical router, which is how the logical router is actually implemented in the datacenter. That is, the logical router is an abstraction describing a set of functionalities (e.g., routing, NAT, etc.) that a user configures for the logical router. The logical router is then implemented by various machines in the datacenter based on instructions distributed to those machines by a set of network controllers, with the instructions generated by the network controllers according to the configuration provided by the user.

In the control plane view, the logical router of some embodiments may include one or both of a single DR and one or more SRs. The DR, in some embodiments, spans managed forwarding elements (MFEs) that couple directly to VMs or other data compute nodes that are logically connected, directly or indirectly, to the logical router. The DR of some embodiments also spans the gateways to which the logical router is bound. The DR, in some embodiments, is responsible for first-hop distributed routing between logical switches and/or other logical routers that are logically connected to the logical router. The SRs of some embodiments are responsible for delivering services that are not implemented in a distributed fashion (e.g., some stateful services).

In some embodiments, the physical realization of a logical router always has a DR (i.e., for first-hop routing). A logical router will have SRs if either (i) the logical router is a PLR, and therefore connects to external physical networks or (ii) the logical router has services configured that do not have a distributed implementation (e.g., NAT, load balancing, DHCP in some embodiments). Even if there are no stateful services configured on a PLR, some embodiments use SRs in the implementation to centralized the connection to the external network.

A. Single-Tier Logical Router

Figure 1:
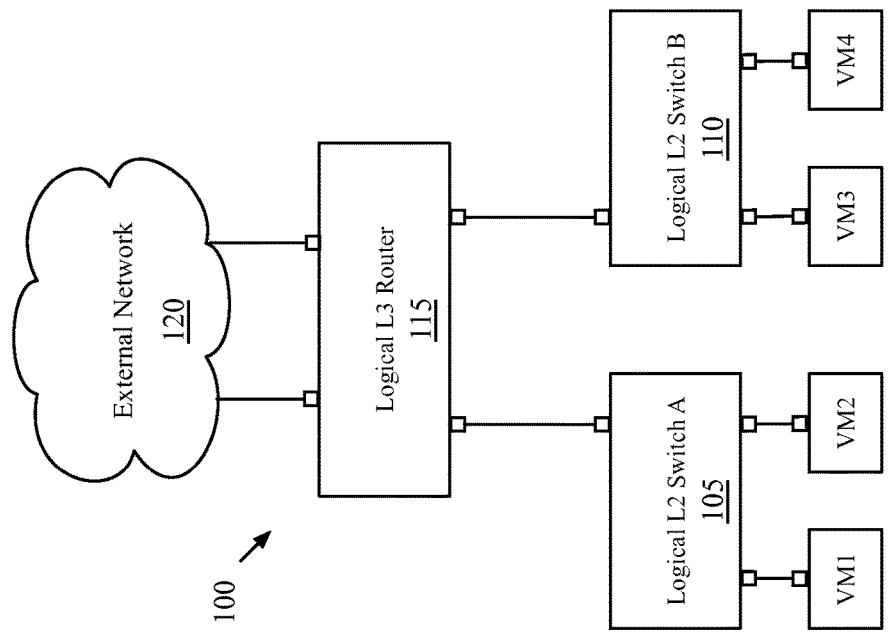
FIG. 1 illustrates a configuration view of a logical router, which represents a logical network as designed by a user.
Figure 3:
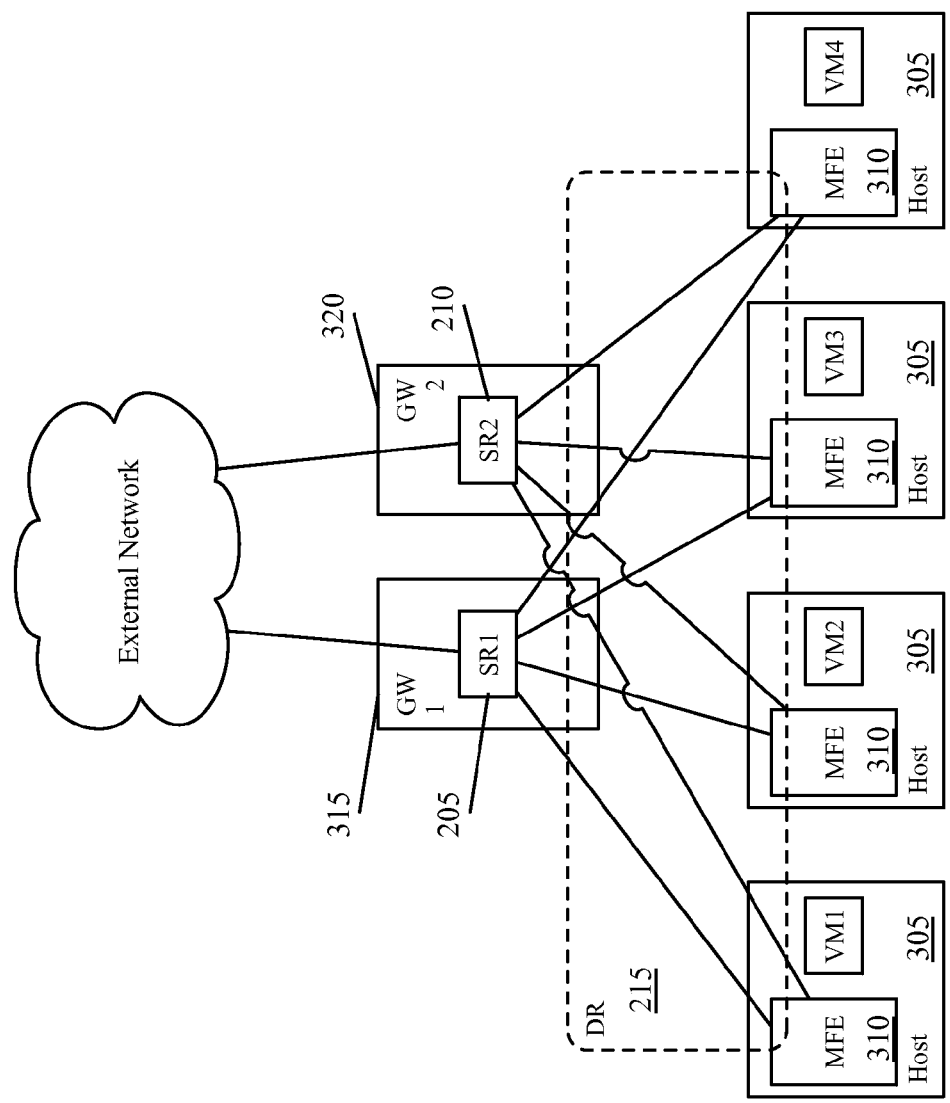
FIG. 3 illustrates a physical distributed implementation of the logical router of FIG. 1.

FIGS. 1-3 illustrate the three different views of a distributed logical router implementation. FIG. 1 specifically illustrates the configuration view, which represents a logical network 100 as designed by a user. As shown, the logical router 115 is part of a logical network 100 that includes the logical router 115 and two logical switches 105 and 110. The two logical switches 105 and 110 each have VMs that connect to logical ports. While shown as VMs in these figures, it should be understood that other types of data compute nodes (e.g., namespaces, etc.) may connect to logical switches in some embodiments. The logical router 115 also includes two ports that connect to the external physical network 120.

FIG. 2 illustrates the management plane view 200 of the logical network 100. The logical switches 105 and 110 are the same in this view as the configuration view, but the network controller has created two service routers 205 and 210 for the logical router 115, as well as a distributed router 215 and a transit logical switch 220. The DR 215 includes a southbound interface for each of the logical switches 105 and 110, and a single northbound interface to the transit logical switch 220 (and through this to the SRs). The SRs 205 and 210 each include a single southbound interface to the transit logical switch 220 (used to communicate with the DR 215, as well as each other in certain situations). Each SR 205 and 210 also corresponds to an uplink port of the logical router (that connects to the external network), and thus each of the SRs has a single such interface.

The detailed configuration of the northbound and southbound interfaces of the various router constructs 205-215 and their connections with the transit logical switch 220 will be described in further detail below. In some embodiments, the management plane generates separate routing information bases (RIBs) for each of the router constructs 205-215. That is, in addition to having separate objects created in the management/control plane, each of the router constructs 205 is treated as a separate router with separate routes.

Finally, FIG. 3 illustrates a physical implementation of the logical router 100. As shown, each of the VMs that couples to one of the logical switches 105 and 110 in the logical network 100 resides on a host machine 305. The MFEs 310 that operate on these host machines in some embodiments are virtual switches (e.g., Open vSwitch (OVS), ESX) that operate within the hypervisors or other virtualization software on the host machines. These MFEs perform first-hop switching and routing to implement the logical switches 105 and 110, and the logical router 115, for packets sent by the VMs of the logical network 100. The MFEs 310 (or a subset of them) also may implement logical switches (and distributed logical routers) for other logical networks if the other logical networks have VMs that reside on the host machines 305 as well.

The two SRs 205 and 210 each operate on a different gateway machine 315 and 320. The gateway machines 315 and 320 are host machines similar to the machines 305 in some embodiments, but host SRs rather than user VMs. In some embodiments, the gateway machines 315 and 320 each include an MFE as well as the SR, in order for the MFE to handle logical switching as well as routing for the DR 215. For instance, packets sent from the external network 120 may be routed by the SR routing table on one of the gateway machines and then subsequently switched and routed (according to the DR routing table) by the MFE on the same gateway.

The SRs may be implemented in a namespace, a virtual machine, or as a VRF in different embodiments. The SRs may operate in an active-active or active-standby mode in some embodiments, depending on whether any stateful services (e.g., firewalls) are configured on the logical router. When stateful services are configured, some embodiments require only a single active SR. In some embodiments, the active and standby service routers are provided with the same configuration, but the MFEs are configured to send packets via a tunnel to the active SR (or to the MFE on the gateway machine with the active SR). Only if the tunnel is down will the MFE send packets to the standby gateway.

B. Multi-Tier Topology

Figure 4:
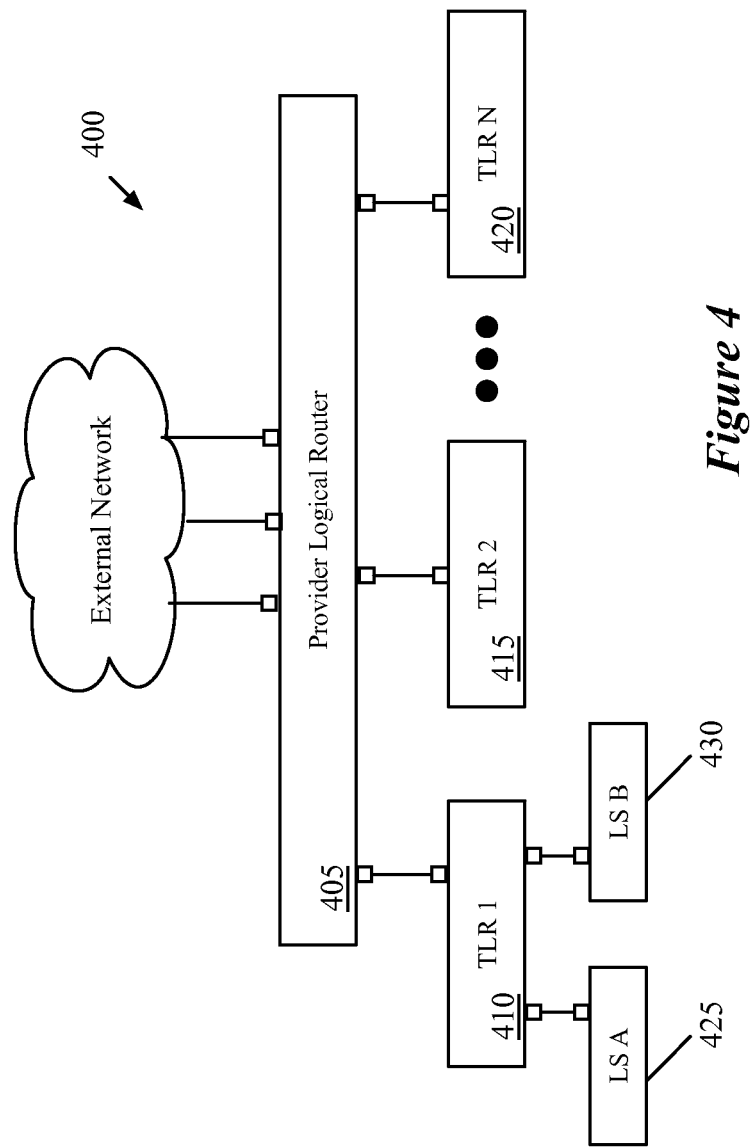
FIG. 4 conceptually illustrates a logical network with two tiers of logical routers.

The previous example illustrates only a single tier of logical router. For logical networks with multiple tiers of logical routers, some embodiments may include both DRs and SRs at each level, or DRs and SRs at the upper level (the PLR tier) with only DRs at the lower level (the TLR tier). FIG. 4 conceptually illustrates a multi-tier logical network 400 of some embodiments, with FIGS. 5 and 6 illustrating two different management plane views of the logical networks.

FIG. 4 conceptually illustrates a logical network 400 with two tiers of logical routers. As shown, the logical network 400 includes, at the layer 3 level, a provider logical router 405 and several tenant logical routers 410-420. The first tenant logical router 410 has two logical switches 425 and 430 attached, with one or more data compute nodes coupling to each of the logical switches. For simplicity, only the logical switches attached to the first TLR 410 are shown, although the other TLRs 415-420 would typically have logical switches attached (to which data compute nodes couple).

In some embodiments, any number of TLRs may be attached to a PLR such as the PLR 405. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR (because, e.g., the routing table for the PLR might get too big). Part of the routing table for a PLR includes routes for all of the logical switch domains of its TLRs, so attaching numerous TLRs to a PLR creates several routes for each TLR just based on the subnets attached to the TLR. The PLR 405, as shown in the figure, provides a connection to the external physical network 435; some embodiments only allow the PLR to provide such a connection, so that the datacenter provider can manage this connection. Each of the separate TLRs 410-420, though part of the logical network 400, are configured independently (although a single tenant could have multiple TLRs if they so chose).

Figure 5:
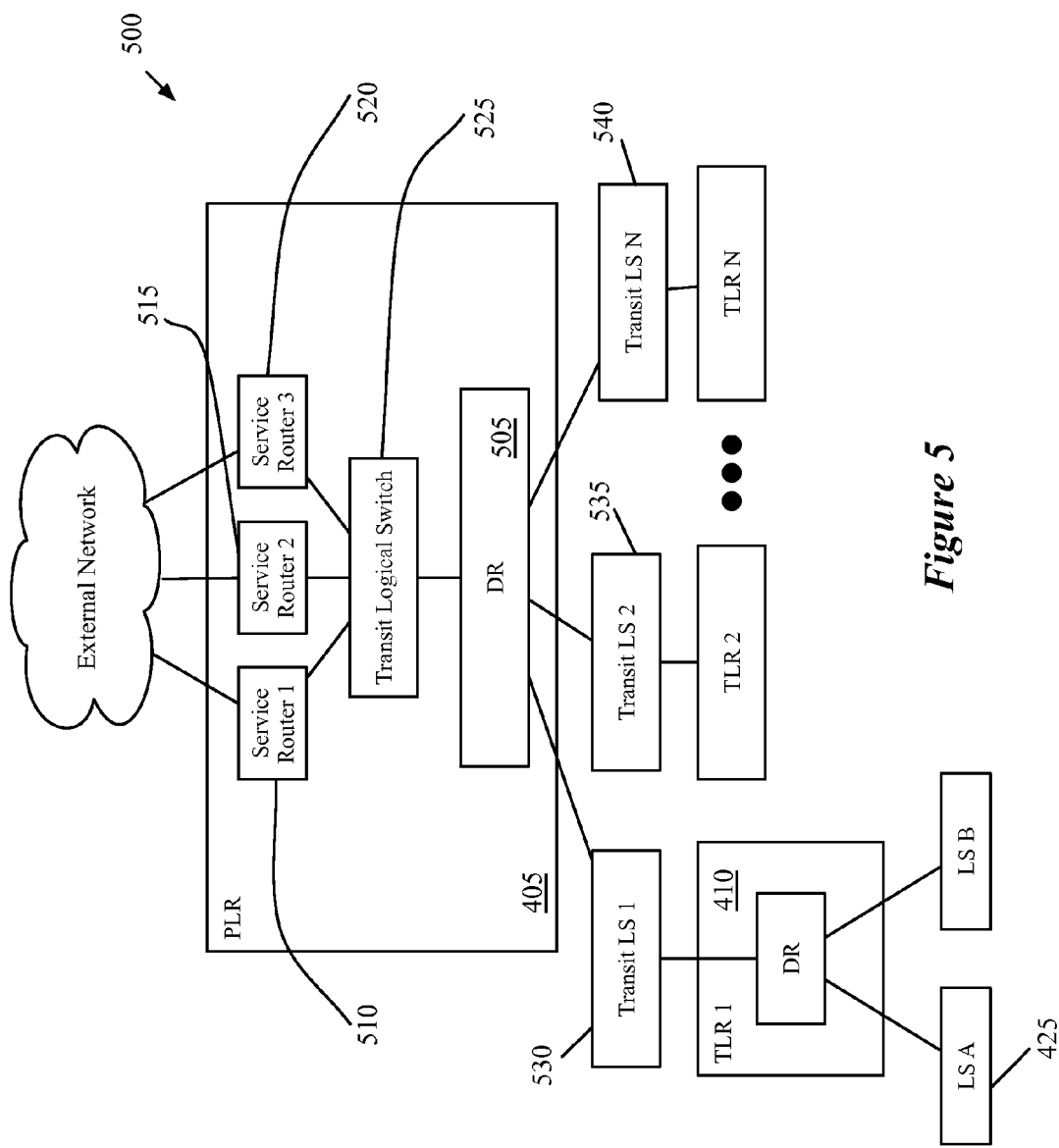
FIG. 5 illustrates the management plane view for the logical topology of FIG. 4 when a TLR in the logical network is completely distributed.
Figure 6:
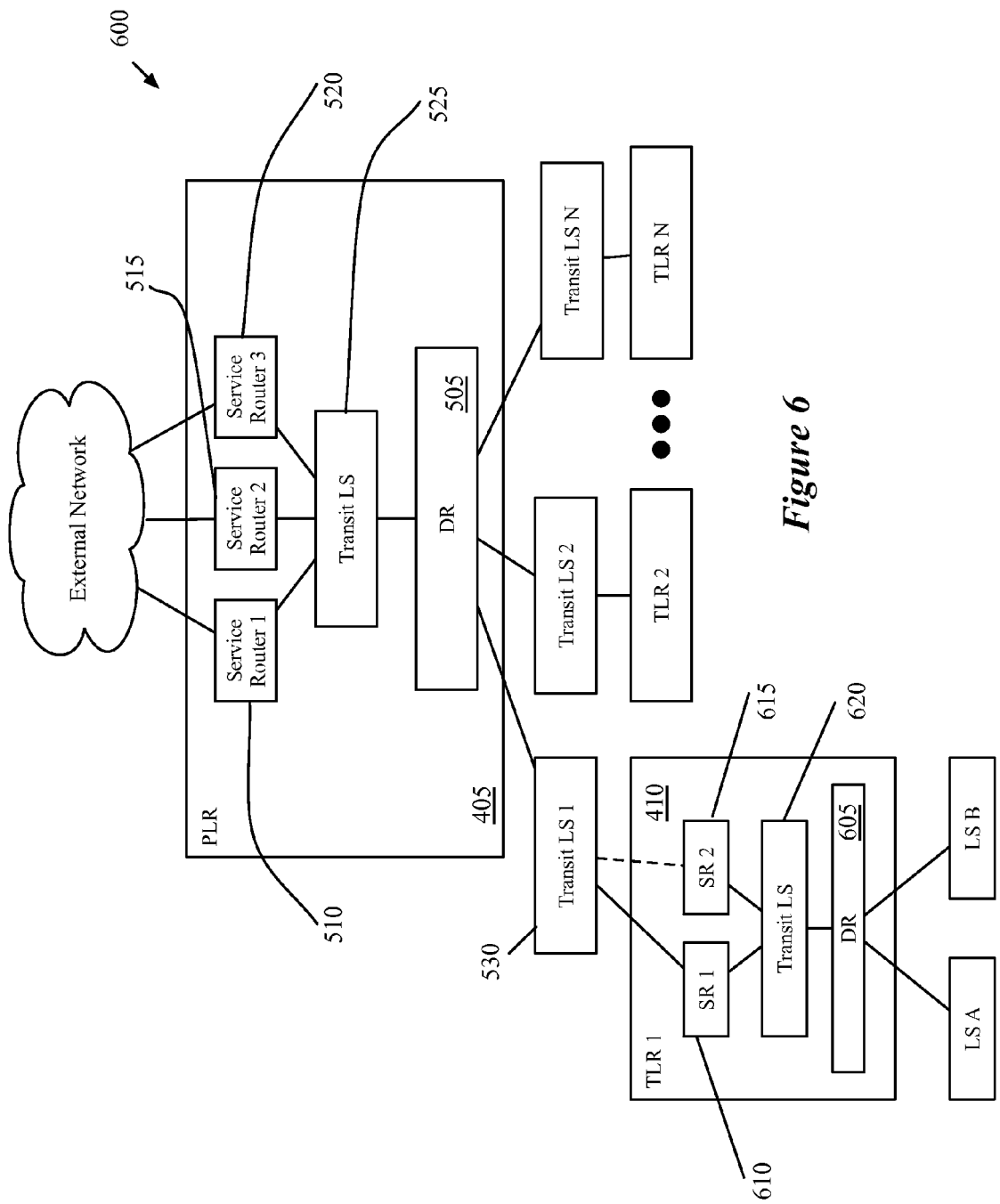
FIG. 6 illustrates the management plane view for the logical topology of FIG. 4 when the TLR in the logical network has a centralized component.

FIGS. 5 and 6 illustrate different possible management plane views of the logical network 400, depending on whether or not the TLR 405 includes a centralized component. In these examples, the routing aspects of the TLR 405 are always distributed using a DR. However, if the configuration of the TLR 405 includes the provision of stateful services, then the management plane view of the TLR (and thus the physical implementation) will include active and standby SRs for these stateful services.

Thus, FIG. 5 illustrates the management plane view 500 for the logical topology 400 when the TLR 405 is completely distributed. For simplicity, only details of the first TLR 410 are shown; the other TLRs will each have their own DR, as well as SRs in some cases. As in FIG. 2, the PLR 405 includes a DR 505 and three SRs 510-520, connected together by a transit logical switch 525. In addition to the transit logical switch 525 within the PLR 405 implementation, the management plane also defines separate transit logical switches 530-540 between each of the TLRs and the DR 505 of the PLR. In the case in which the TLR 410 is completely distributed (FIG. 5), the transit logical switch 530 connects to a DR 545 that implements the configuration of the TLR 410. Thus, as explained in greater detail in U.S. Provisional Application 62/110,061, filed Jan. 30, 2015, which is incorporated herein by reference, a packet sent to a destination in the external network by a data compute node attached to the logical switch 425 will be processed through the pipelines of the logical switch 425, the DR 545 of TLR 410, the transit logical switch 530, the DR 505 of the PLR 405, the transit logical switch 525, and one of the SRs 510-520. In some embodiments, all of the In some embodiments, the existence and definition of the transit logical switches 525 and 530-540 are hidden from the user that configures the network through the API (e.g., an administrator), with the possible exception of troubleshooting purposes.

FIG. 6 illustrates the management plane view 600 for the logical topology 400 when the TLR 405 has a centralized component (e.g., because stateful services that cannot be distributed are defined for the TLR). In some embodiments, stateful services such as firewalls, NAT, load balancing, etc. are only provided in a centralized manner. Other embodiments allow for some or all of such services to be distributed, however. As with the previous figure, only details of the first TLR 410 are shown for simplicity; the other TLRs may have the same defined components (DR, transit LS, and two SRs) or have only a DR as in the example of FIG. 5).

The PLR 405 is implemented in the same manner as in the previous figure, with the DR 505 and the three SRs 510, connected to each other by the transit logical switch 525. In addition, as in the previous example, the management plane places the transit logical switches 530-540 between the PLR and each of the TLRs.

The partially centralized implementation of the TLR 410 includes a DR 605 to which the logical switches 425 and 430 attach, as well as two SRs 610 and 615. As in the PLR implementation, the DR and the two SRs each have interfaces to a transit logical switch 620. This transit logical switch serves the same purposes as the switch 525, in some embodiments. For TLRs, some embodiments implement the SRs in active-standby manner, with one of the SRs designated as active and the other designated as standby. Thus, so long as the active SR is operational, packets sent by a data compute node attached to one of the logical switches 425 and 430 will be sent to the active SR rather than the standby SR. In some embodiments, the transit logical switch 530 only includes a single port to connect to the TLR 410, and this port connects to the first SR 610, unless the SR fails and the connection moves to the second SR 615. As such, this connection is shown as a dashed line in the figure.

The above figures illustrate the management plane view of logical routers of some embodiments. In some embodiments, an administrator or other user provides the logical topology (as well as other configuration information) through an API. This data is provided to a management plane, which defines the implementation of the logical network topology (e.g., by defining the DRs, SRs, transit logical switches, etc.). In addition, in some embodiments a user associates each logical router (e.g., each PLR or TLR) with a set of physical machines (e.g., a pre-defined group of machines in the datacenter) for deployment. For purely distributed routers, such as the TLR 405 as implemented in FIG. 5, the set of physical machines is not important, as the DR is implemented across the managed forwarding elements that reside on hosts along with the data compute nodes that connect to the logical network. However, if the logical router implementation includes SRs, then these SRs will each be deployed on specific physical machines. In some embodiments, the group of physical machines is a set of machines designated for the purpose of hosting SRs (as opposed to user VMs or other data compute nodes that attach to logical switches). In other embodiments, the SRs are deployed on machines alongside the user data compute nodes.

In some embodiments, the user definition of a logical router includes a particular number of uplinks. Described herein, an uplink is a northbound interface of a logical router in the logical topology. For a TLR, its uplinks connect to a PLR (all of the uplinks connect to the same PLR, generally). For a PLR, its uplinks connect to external routers. Some embodiments require all of the uplinks of a PLR to have the same external router connectivity, while other embodiments allow the uplinks to connect to different sets of external routers. Once the user selects a group of machines for the logical router, if SRs are required for the logical router, the management plane assigns each of the uplinks of the logical router to a physical machine in the selected group of machines. The management plane then creates an SR on each of the machines to which an uplink is assigned. Some embodiments allow multiple uplinks to be assigned to the same machine, in which case the SR on the machine has multiple northbound interfaces.

As mentioned above, in some embodiments the SR may be implemented as a virtual machine or other container, or as a VRF context (e.g., in the case of DPDK-based SR implementations). In some embodiments, the choice for the implementation of an SR may be based on the services chosen for the logical router and which type of SR best provides those services.

In addition, the management plane of some embodiments creates the transit logical switches. For each transit logical switch, the management plane assigns a unique VNI to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous TLRs (e.g., the network topology 400), each of which may have its own transit logical switch. That is, in FIG. 6, transit logical switch 525 within the PLR implementation, transit logical switches 530-540 between the PLR and the TLRs, and transit logical switch 620 (as well as the transit logical switch within the implementation of any of the other TLRs) each require a unique subnet. Furthermore, in some embodiments, the SR may need to initiate a connection to a VM in logical space, e.g. HA proxy. To ensure that return traffic works, some embodiments avoid using link local IP addresses.

Some embodiments place various restrictions on the connection of logical routers in a multi-tier configuration. For instance, while some embodiments allow any number of tiers of logical routers (e.g., a PLR tier that connects to the external network, along with numerous tiers of TLRs), other embodiments only allow a two-tier topology (one tier of TLRs that connect to the PLR). In addition, some embodiments allow each TLR to connect to only one PLR, and each logical switch created by a user (i.e., not a transit logical switch) is only allowed to connect to one PLR or one TLR. Some embodiments also add the restriction that southbound ports of a logical router must each be in different subnets. Thus, two logical switches may not have the same subnet if connecting to the same logical router. Lastly, some embodiments require that different uplinks of a PLR must be present on different gateway machines. It should be understood that some embodiments include none of these requirements, or may include various different combinations of the requirements.

II. SR and DR Configuration

When a user configures a logical router (e.g., by configuring its interfaces and provisioning routes), this configuration is used by the management plane to configure the SRs and DR for the logical router. For instance, the logical router 115 of FIG. 1 has four interfaces (two to the logical switches, and two uplinks). However, its distributed management plane implementation in FIG. 2 includes a DR with three interfaces and SRs with two interfaces each (a total of seven interfaces). The IP and MAC addresses and other configuration details assigned to the four interfaces as part of the logical router configuration are used to generate the configuration for the various components of the logical router.

In addition, as part of the configuration, some embodiments generate a routing information base (RIB) for each of the logical router components. That is, although the administrator defines only a single logical router, the management plane and/or control plane of some embodiments generates separate RIBs for the DR and for each of the SRs. For the SRs of a PLR, in some embodiments the management plane generates the RIB initially, but the physical implementation of the SR also runs a dynamic routing protocol process (e.g., BGP, OSPF, etc.) to supplement the RIB locally.

Some embodiments include several types of routes in the RIB of a logical routers, and therefore in the RIBs of its component routers. All routes, in some embodiments, include administrative distance values, used to determine priority, with larger values indicating lower priority types of route (i.e., if two routes exist for the same prefix, the one with a lower distance value is used). If multiple routes for the same prefix are in the RIB with the same distance value, traffic to these prefixes is spread across the different routes (e.g., using ECMP principles to balance the traffic evenly).

connected (0): prefixes configured on the logical router's ports static (1): configured by the administrator/user management plane internal (10): default routes—when a TLR is connected to a PLR, a default route pointing to the PLR is added to the RIB of the TLR; when a logical switch is connected to a TLR, the user allows the subnet to be redistributed, and the subnet is not NAT'ed, a default route pointing to the TLR for the subnet is added to the RIB of the PLR EBGP (20): the next four types are routes learned through dynamic routing protocols OSPF internal (30)

OSPF external (110)

IBGP (200).

It should be understood that not all logical routers will include both BGP and OSPF routes in some embodiments, and some logical routers may include neither. For instance, a logical router that does not include a connection to external networks may not use any routing protocol, and some logical routers may run only one type of route-sharing protocol, rather than both BGP and OSPF.

In addition, in some embodiments, the SRs of the PLRs (that use the dynamic routing protocols) merge the RIB received from the centralized controllers (containing static, connected, and management plane internal routes) with the routes learned from the physical routers (via the dynamic routing protocols). The SR locally calculates its FIB based on the incorporation of these dynamic routes in order to expedite route convergence, rather than sending the learned routes back to the centralized controller for recalculation. For the DRs, the centralized controllers of some embodiments pushes down the entire RIB, with a local control plane calculating the FIB.

A. DR Configuration

In some embodiments, the DR is always located on the southbound side (i.e., facing the data compute nodes of the logical network, rather than facing the external physical network) of the logical router implementation. Unless the logical router has no centralized component, the uplinks of the logical router will not be configured for the DR, whose northbound interfaces instead couple to the transit logical switch that is part of the logical router.

Figure 7:
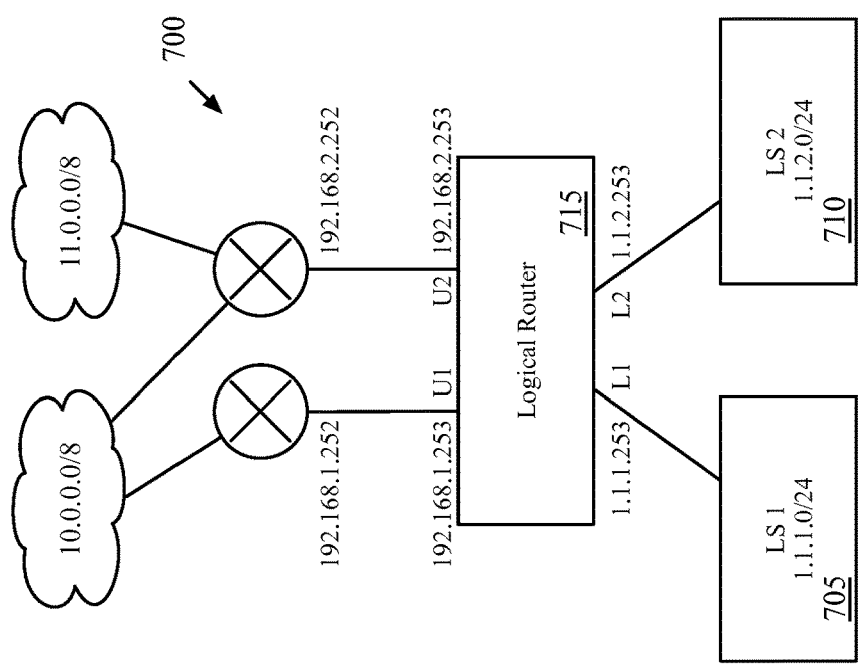
FIG. 7 conceptually illustrates a more detailed configuration of a logical network topology, including the network addresses and interfaces assigned by an administrator.

FIG. 7 conceptually illustrates the more detailed configuration of a logical network topology 700, including the network addresses and interfaces assigned by an administrator. As shown, the logical switches 705 and 710 are each assigned their own subnets, 1.1.1.0/24 and 1.1.2.0/24, and all of the data compute nodes attached to the logical switches 705 will have IP addresses in the corresponding subnet. The logical router 715 has an interface L1 to the first logical switch 705, with an IP address of 1.1.1.253 that is the default gateway for the data compute nodes in the subnet 1.1.1.0/24. The logical router 715 also has a second interface L2 to the second logical switch 710, with an IP address of 1.1.2.253 that is the default gateway for the data compute nodes in the subnet 1.1.2.0/24.

The northbound side of the logical router 715 has two uplinks, U1 and U2. The first uplink U1 has an address of 192.168.1.252 and connects to a first physical router 720 with an IP address of 192.168.1.252. The second uplink U2 has an IP address of 192.168.2.253 and connects to a second physical router 725 with an IP address of 192.168.2.252. The physical routers 720 and 725 are not actually part of the logical network, but rather connect the logical network to the external network. Though in the illustrated case each of the uplinks connects to a single, different physical router, in some cases each of the uplinks will connect to the same set of several physical routers. That is, both U1 and U2 might both connect to both of the physical routers 720 and 725. Some embodiments require that each of the external routers to which the uplinks connect provide the same connectivity, although this is not the case in the illustrated example. Instead, the first physical router 720 connects to the subnet 10.0.0.0/8, while the second router 725 connects to both the subnet 10.0.0.0/8 and 11.0.0.0/8.

For a logical router with a distributed component, some embodiments configure the DR as follows. The southbound interfaces are configured in the same way as the southbound interfaces of the logical router. These interfaces are those that connect to a logical switch in the logical topology, or to a lower-level logical router (e.g., the southbound interfaces of a PLR may connect to TLRs). The DR of some embodiments is allocated a single northbound interface, which is assigned an IP address and a MAC address. Assuming the logical router has one or more SRs, the northbound interface of the DR connects to a transit logical switch.

The RIB of the DR is assigned connected routes based on the subnets configured on its various southbound and northbound interfaces. These are the subnets configured for (i) the transit logical switch configured between the DR and SR components of the logical router, and (ii) any logical switches on its southbound interfaces. These logical switches on the southbound interfaces may be user-defined logical domains to which data compute nodes connect, or transit logical switches located between the DR of a PLR and any TLRs that connect to the PLR.

In addition, any static routes that egress from an uplink of the logical router are included in the RIB of the DR; however, these routes are modified such that the next-hop IP address is set to that of the uplink's SR. For example, a static route "a.b.c.0/24 via 192.168.1.252" (192.168.1.252 being an address of an external physical network router) is modified to be "a.b.c.0/24 via [IP of SR southbound interface]". Static routes that egress from a southbound interface of the logical router, on the other hand, are included in the RIB of the DR unmodified. In some embodiments, for each SR of the logical router, a default route of the type management plane internal is added to the RIB of the DR. Instead, in other embodiments, dynamic routes learned by a particular SR are added to the RIB, with the next-hop IP address modified to be the IP of the southbound interface of the particular SR. This is an alternative to the default route, because the management plane internal type would otherwise have a higher priority than the dynamic routes learned by the SR. However, for TLRs, the SRs do not run a dynamic routing protocol in some embodiments, so the default route with a next-hop IP address pointing to the interface of the active SR is used instead.

Figure 8:
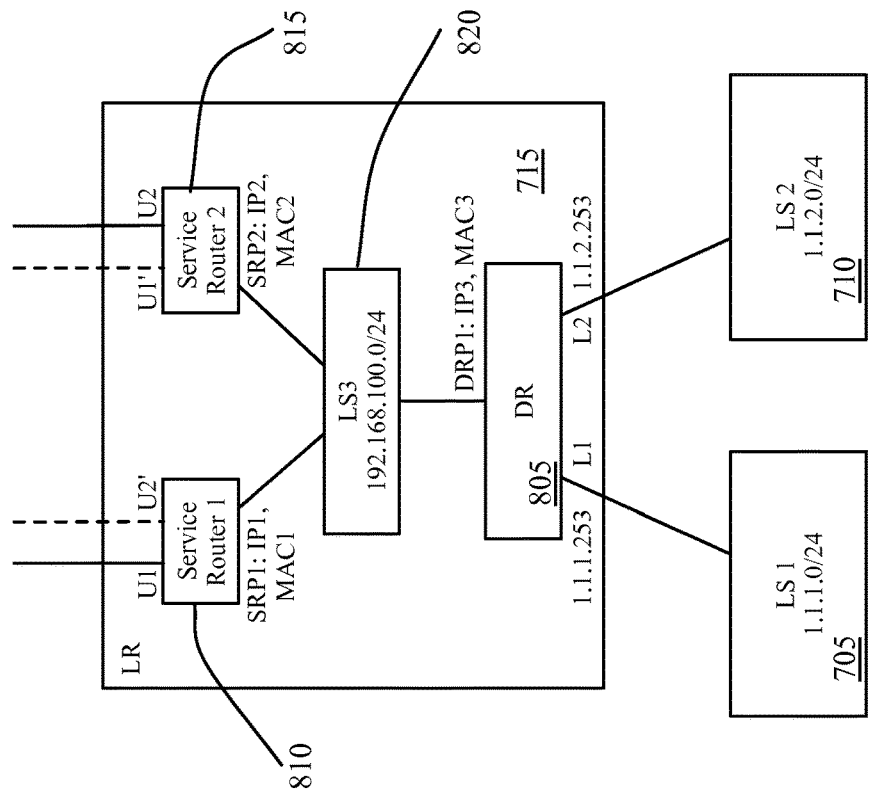
FIG. 8 illustrates the configuration of the logical topology of FIG. 7 by the management plane.

FIG. 8 illustrates the configuration 800 of the logical topology 700 by the management plane. As shown, the logical switches 705 and 710 are configured as indicated by the user configuration. As in the previous examples, the logical router 715 includes a DR 805, two SRs 810 and 815, and a transit logical switch 820. The DR is assigned the two southbound interfaces of the logical router 705, which connect to the logical switches 705 and 710. The transit logical switch is assigned a subnet of 192.168.100.0/24, which needs to satisfy the requirement that it be unique among the logical switches that logically connect (directly or indirectly) to the logical router 705. Each of the three management plane router constructs 805-815 also includes an interface that connects to the transit logical switch, and has an IP address in the subnet of the transit logical switch. The northbound interfaces U1 and U2 are assigned to the two SRs 810 and 815, the configuration of which is described below.

Using the rules of some embodiments described above for generating the RIB, the RIB of the DR 805 includes the following routes:

1.1.1.0/24 output to L1
1.1.2.0/24 output to L2
192.168.100.0/24 output to DRP1
192.168.1.0/24 via IP1
192.168.2.0/24 via IP2
10.0.0.0/8 via IP1
10.0.0.0/8 via IP2
11.0.0.0/8 via IP2
0.0.0.0/0 via IP1
0.0.0.0/0 via IP2

The above routes include three connected routes, for the logical switch domains connected to the DR (1.1.1.0/24, 1.1.2.0/24, and 192.168.100.0/24). In addition, the subnet on which the first uplink is located (192.168.1.0/24) is reached via the southbound interface of the first SR 810 (IP1), while the subnet on which the second uplink is located (192.168.2.0/24) is reached via the southbound interface of the second SR 815 (IP2). In addition, three static routes have been added by the user for the logical router 715, which the management plane automatically modifies for the DR 805. Specifically, the routes include the network 10.0.0.0/8 via the southbound interface of either of the SRs, and the network 11.0.0.0/8 via the southbound interface of SR2. Lastly, default routes pointing to these same southbound interfaces are included. The IP addresses IP1, IP2, and IP3 that are created by the management plane for the ports of the logical router constructs that interface with the transit logical switch all are in the subnet 192.168.100.0/24.

B. SR Configuration

As with the DR of a logical router, the management plane also configures each SR of the logical router with a separate RIB and interfaces. As described above, in some embodiments SRs of both PLRs and TLRs may deliver services (i.e., functionalities beyond simply routing, such as NAT, firewall, load balancing, etc.) and the SRs for PLRs also provide the connection between the logical network and external physical networks. In some embodiments, the implementation of the SRs is designed to meet several goals. First, the implementation ensures that the services can scale out—that is, the services assigned to a logical router may be delivered by any of the several SRs of the logical router. Second, some embodiments configure the SR in such a way that the service policies may depend on routing decisions (e.g., interface-based NAT). Third, the SRs of a logical router have the ability to handle failure (e.g., of the physical machine on which an SR operates, of the tunnels to that physical machine, etc.) among themselves without requiring the involvement of a centralized control plane or management plane (though some embodiments allow the SRs to operate at reduced capacity or in a suboptimal manner). Finally, the SRs ideally avoid unnecessary redirecting amongst themselves. That is, an SR should forward packets to the external physical network if it has the ability do so locally, only forwarding the packet to a different SR if necessary. Of course, the forwarding between SRs should avoid packet loops.

As shown in FIG. 8, each SR has one southbound interface that connects to the transit logical switch 820 that resides between the SRs and the DR. In addition, in some embodiments, each SR has the same number of northbound interfaces as the logical router. That is, even though only one uplink may be assigned to the physical machine on which the SR operates, all of the logical router interfaces are defined on the SR. However, some of these interfaces are local interfaces while some of them are referred to as dummy interfaces.

The local northbound interfaces, in some embodiments, are those through which a packet can egress directly from the SR (e.g., directly to the physical network). An interface configured based on the uplink (or one of the uplinks) assigned to the SR is a local interface. On the other hand, an interface configured based on one of the other uplinks of the logical router assigned to a different SR is referred to as a dummy interface. Providing the SR with configuration for the dummy interfaces allows for the first-hop MFEs to send packets for any of the uplinks to any of the SRs, with that SR able to process the packets even if the packet is not destined for its local interface. Some embodiments, after processing a packet at one of the SRs for a dummy interface, forward the packet to the appropriate SR where that interface is local, in order for the other SR to forward the packet out to the external physical network. The use of dummy interfaces also allows the centralized controller (or set of controllers) that manages the network to push service policies that depend on routing decisions to all of the SRs, thereby allowing services to be delivered by any of the SRs.

As discussed below in Section IV, in some embodiments the SRs exchange routing information with the physical network (e.g., using a route advertisement protocol such as BGP or OSPF). One goal of this route exchange is that irrespective of which SR routes a packet towards the physical network, the routing decision should always point to either a local interface of the SR or a dummy interface that corresponds to an uplink of the logical router on a different SR. Thus, the policies associated with the logical router uplink can be applied by the SR even when the uplink is not assigned to that SR, enabling the scale out of stateful services. In some embodiments, the routes received from a peer SR will have a larger distance value than routes learned directly from a physical next-hop router, thereby ensuring that a SR will send a packet to its peer SR only when it cannot send the packet directly to a physical network router.

For a logical router that has one or more centralized components, some embodiments configure the SR as follows. For northbound interfaces, the SR has the same number of such interfaces as the logical router, and these interfaces each inherit the IP and MAC address of the corresponding logical router interfaces. A subset of these interfaces are marked as local interfaces (those for which the uplink is assigned to the SR), while the rest of the interfaces are marked as dummy interfaces. In some embodiments, the service policies defined for the logical router are pushed equivalently to all of the SRs, as these are configured in the same way from the network and interface perspective. The dynamic routing configuration for a particular logical router port/uplink are transferred to the local interface of the SR to which that particular uplink is assigned.

Each SR, as mentioned, is assigned a single southbound interface (also a local interface) that connects to a transit logical switch, with each SR's southbound interface connecting to the same transit logical switch. The IP addresses for each of these southbound interfaces is in the same subnet as the northbound interface assigned to the DR (that of the transit logical switch). Some embodiments differentiate the assignment of IP addresses between the SRs depending on whether the SRs are in active-active or active-standby mode. For active-active mode (i.e., when all of the SRs are treated as equals for routing purposes), different IP and MAC addresses are assigned to the southbound interfaces of all of the SRs. On the other hand, in active-standby mode, the same IP is used for both of the southbound interfaces of the two SRs, while each of the interfaces is assigned a different MAC address.

As indicated in the above subsection regarding DRs, users may configure static routes for the logical router. A static route (or a connected route) of the logical router that egresses from an uplink is copied to the RIB of the SR. The distance metric for such a route is unmodified if the uplink through which the route egresses is assigned to the SR; however, if the uplink is a dummy interface on the SR, then some embodiments add a value to this metric so that the SR will prefer a route that egresses from its local interface when the network can be reached without redirecting the packet to a different SR through a dummy interface. In addition, the SRs (of a top-level logical router) may learn dynamic routes and place these in their RIB (though some embodiments perform this locally, without involving the centralized controllers). In some embodiments, the dynamic routes learned from peer SRs are installed without this adjustment of the distance metric, because by default the metric for routes learned from IBGP (SR to SR peering) or OSPF are larger than the metric for routes learned from EBGP.

For each southbound interface of the logical router, some embodiments add a route for the corresponding network to the RIB of each SR. This route points to the northbound DR interface as its next-hop IP address. Furthermore, any other routes configured for the logical router that egress from the southbound interface are copied to the SR with the same northbound DR interface as the next-hop IP address.

Returning to the example of FIG. 8, as the logical router 715 has two uplinks, the management plane defines two service routers 810 and 815. The first service router 810 has a local interface for U1 and a dummy interface for U2, referred to as U2'. Similarly, the second service router 815 has a local interface for U2 and a dummy interface, U1', for the first uplink U1. The function of these dummy interfaces is described above, as these interfaces are used to redirect packets to the other SR. Each of these SRs is assigned a southbound interface, with different IP and MAC addresses (as the SRs are in an active-active configuration). The IP addresses IP1 (for the first SR 810) and IP2 (for the second SR 815) are in the subnet 192.1.100.0/24, as is IP3 (the northbound interface of the DR 805).

Using the rules of some embodiments, and assuming that a routing protocol (e.g., BGP) is enabled for the SRs, the RIB of the first SR 810 will include the following routes:

10.0.0.0/8 output to U1 via 192.168.1.252, metric 20 (via EBGP)
10.0.0.0/8 output to U2' via 192.168.2.252, metric 200 (via IBGP)
11.0.0.0/8 output to U2' via 192.168.2.252, metric 200 (via IBGP)
192.168.1.0/24 output to U1, metric 0 (connected)
192.168.100.0/24 output to SRP1, metric 0 (connected)
1.1.1.0/24 via IP3, metric 10 (management plane internal)
1.1.2.0/24 via IP3, metric 10 (management plane internal)

Similarly, the RIB of the second SR 815 will include the following routes:
- 10.0.0.0/8 output to U2 via 192.168.2.252, metric 20 (via EBGP)
- 10.0.0.0/8 output to U1' via 192.168.1.252, metric 200 (via IBGP)
- 11.0.0.0/8 output to U2 via 192.168.2.252, metric 20 (via EBGP)
- 192.168.2.0/24 output to U2, metric 0 (connected)
- 192.168.100.0/24 output to SRP2, metric 0 (connected)
- 1.1.1.0/24 via IP3, metric 10 (management plane internal)
- 1.1.2.0/24 via IP3, metric 10 (management plane internal)

C. Management Plane Processes

Figure 9:
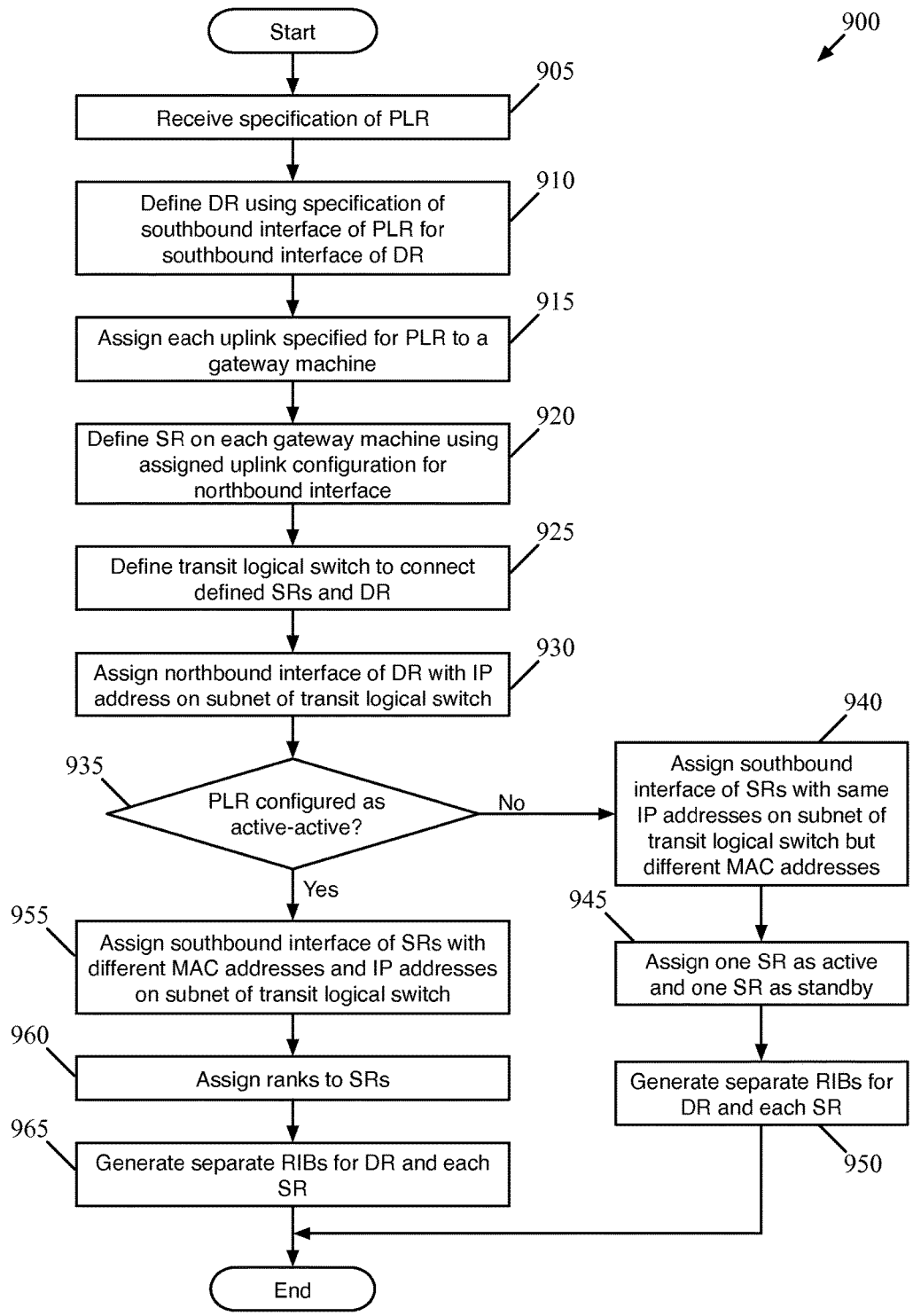
FIG. 9 conceptually illustrates a process of some embodiments for configuring a PLR based on a user specification.

FIG. 9 conceptually illustrates a process 900 of some embodiments for configuring a PLR based on a user specification. In some embodiments, the process 900 is performed by the management plane (e.g., a set of modules at a centralized controller that manages the networks of a datacenter). The management plane performs the configuration process, then uses a centralized control plane of the controller (or of a different network controller) to distribute the data to various local control planes on the various host machines that implement the configured logical router.

As shown, the process 900 begins by receiving (at 905) a specification of a PLR. The specification of a PLR is based on administrator input to define the PLR (e.g., an administrator employed by the owner of the datacenter). In some embodiments, this specification includes definitions of any services the PLR should provide, whether the PLR will be configured in active-active or active-standby mode (though some embodiments automatically use active-active mode unless stateful services are configured), how many uplinks are configured for the PLR, the IP and MAC addresses of the uplinks, the L2 and L3 connectivity of the uplinks, the subnets of any southbound interfaces of the PLR (one interface if the PLR is intended for a two-tier topology, and any number of interfaces if user logical switches will connect directly in a single-tier topology), any static routes for the RIB of the PLR, as well as other data. It should be understood that different embodiments may include different combinations of the listed data or other data in the configuration data for a PLR.

The process 900 then defines (at 910) a DR using this configuration data. This assumes that the PLR will not be completely centralized, in which case no DR is generated by the management plane. For the southbound interface of the DR, the management plane uses the southbound interface configuration of the PLR. That is, the IP address and MAC address for the DR are those specified for the logical router.

In addition, the process assigns (at 915) each uplink specified for the PLR to a gateway machine. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns each of the uplinks to one of the gateway machines in the selected set. Some embodiments allow multiple uplinks to be assigned to the same gateway machine (so long as the logical router does not have only two uplinks configured in active-standby mode), while other embodiments only allow a single uplink per gateway machine for the PLR irrespective of whether in active-active or active-standby.

After assigning the uplinks to gateway machines, the process 900 defines (at 920) a SR on each of the selected gateway machines. For each SR, the process uses the configuration for the uplink assigned to that gateway machine as the configuration for the northbound interface of the SR. This configuration information includes the IP and MAC address of the uplink, as well as any uplink-specific policies. It should be understood that, for situations in which different policies and/or L3 connectivity are allowed and used between the different uplinks, some embodiments also configure dummy interfaces on the SRs in order to redirect packets if needed.

The process additionally defines (at 925) a transit logical switch to connect the defined SRs and DR. In some embodiments, the management plane assigns a unique VNI (logical switch identifier) to the transit logical switch. In addition, some embodiments require that the subnet assigned to the transit logical switch be unique among the logical network topology. As such, the transit logical switch must use a subnet different from any user-defined logical switches that interface directly with the PLR, as well as all transit logical switches between the PLR and any TLRs that connect to the PLR, all transit logical switches within these TLRs, and any user-defined logical switches that connect to these TLRs.

Next, the process 900 assigns (at 930) a northbound interface to the DR. The northbound interface, in some embodiments, is assigned both a MAC address and an IP address (used for packets sent internally between the components of the PLR). In some embodiments, the IP address is in the subnet that was assigned to the transit logical switch defined at 925. The configuration of the transit logical switch includes an association of this MAC address with one of its logical ports.

The process then determines (at 935) whether the PLR is configured in active-active mode (or active-standby mode). As noted above, in some embodiments, this determination is made by the administrator as part of the configuration settings for the PLR. In other embodiments, the management plane automatically defines the SRs in active-active configuration for PLRs unless stateful services are set up, in which case the SRs are defined in active-standby mode.

When the PLR is configured in active-standby mode, the process assigns (at 940) southbound interfaces of each of the two SRs (or more than two SRs, if there are multiple standbys). In the active-standby case, these southbound interfaces all have the same IP address, which is in the subnet of the transit logical switch defined at operation 925. Although the two interfaces receive the same IP address, the MAC addresses assigned are different, so as to differentiate the two as destinations for northbound packets routed by the DR.

The process then assigns (at 945) one of the SRs as active and one of the SRs as standby. Some embodiments make this determination randomly, while other embodiments attempt to balance the assignment of active and standby SRs across the gateway machines, as described in greater detail in U.S. Patent Publication 2015/0063364, which is incorporated herein by reference. The SR assigned as active will respond to ARP requests for the southbound interface, and will advertise prefixes to the external physical network from its northbound interface. The standby SR, on the other hand, will not respond to ARP requests (so as to avoid receiving northbound traffic), and will not advertise prefixes (but will maintain a BGP session in order to receive routes from the external network in case of failure of the active SR.

Lastly, the process 900 generates (at 950) separate RIBs for the DR and for each of the SRs. The separate RIBs are generated based on the configuration data in the manner described in the previous subsections, as well as below in Section V. The process then ends. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers. The calculation of the FIB by network controllers of some embodiments is described in greater detail in U.S. patent application Ser. No. 14/214,545, filed Mar. 14, 2014, now issued as U.S. Pat. No. 9,313,129, which is incorporated herein by reference.

On the other hand, when the PLR is configured in active-active (ECMP) mode, the process assigns (at 955) southbound interfaces of each of the SRs. In the active-active cases, these southbound interfaces are each assigned different IP addresses in the subnet of the transit logical switch defined at operation 925, as well as different MAC addresses. With different IP addresses, each of the SRs can handle northbound packets based on the IP address selected for a given packet by the DR pipeline in a host machine.

Next, the process assigns (at 960) ranks to the SRs. As described in detail below, the SRs use the ranks in case of failover to determine which SR will take over responsibilities for a failed SR. In some embodiments, the next-highest ranked SR takes over for a failed SR by taking over its southbound interfaces so as to attract northbound traffic that would otherwise be sent to the IP address of the failed SR.

Finally, the process generates (at 965) separate RIBs for the DR and for each of the SRs. The separate RIBs are generated based on the configuration data in the manner described in the previous subsections, as well as below in Section IV. The process then ends. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

Figure 10:
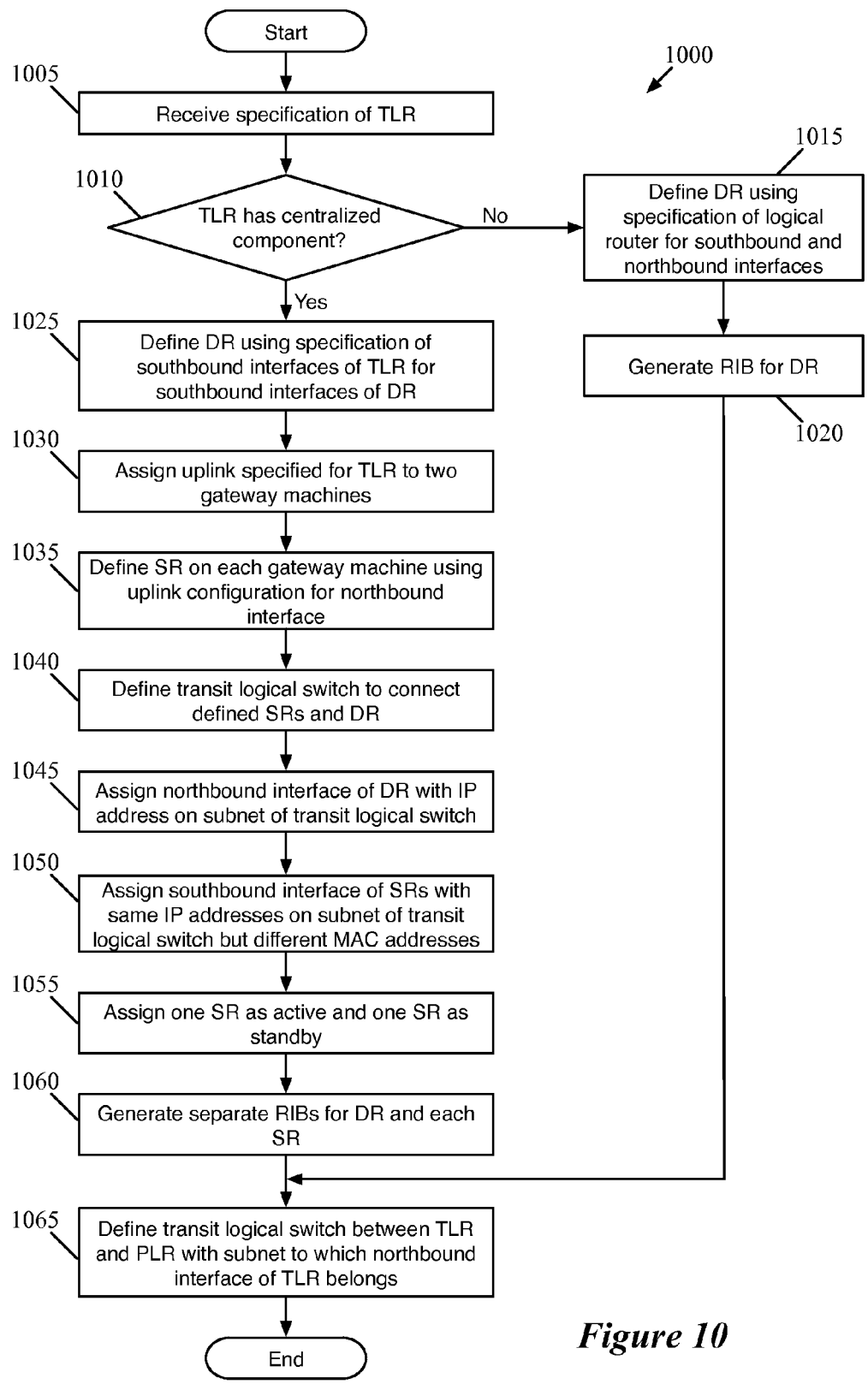
FIG. 10 conceptually illustrates a process of some embodiments for configuring a TLR based on a user specification.

The above description of FIG. 9 indicates the operations of the management plane to generate the various components for a PLR (upper tier logical router). FIG. 10 conceptually illustrates a process 1000 of some embodiments for configuring a TLR based on a user specification. In some embodiments, the process 1000 is performed by the management plane (e.g., a set of modules at a centralized controller that manages the networks of a datacenter). The management plane performs the configuration process, then uses a centralized control plane of the controller (or a different network controller) to distribute the data to various local control planes on the various host machines that implement the configured logical router.

As shown, the process begins by receiving (at 1005) a specification of a TLR. The specification of a TLR is based on administrator input to define the TLR (e.g., an administrator employed by a tenant of the datacenter). In some embodiments, this specification includes definitions of any services the TLR should provide, which PLR the TLR should connect to through its uplink, any logical switches that connect to the TLR, IP and MAC addresses for the interfaces of the TLR, any static routes for the RIB of the TLR, as well as other data. It should be understood that different embodiments may include different combinations of the listed data or other data in the configuration data for the TLR.

The process 1000 then determines (at 1010) whether the TLR has a centralized component. In some embodiments, if the TLR does not provide stateful services, then no SRs are defined for the TLR, and it is implemented only in a distributed manner. On the other hand, some embodiments require SRs in active-standby mode when stateful services are provided, as shown in this figure.

When the TLR does not provide stateful services or otherwise require a centralized component, the process defines (at 1015) a DR using the specification of the logical router for both the southbound and northbound interfaces. The DR may have numerous southbound interfaces, depending on how many logical switches are defined to connect to the TLR. On the other hand, some embodiments restrict TLRs to a single northbound interface that sends packets to and receives packets from a PLR. The process also generates (at 1020) a RIB for the DR. The RIB for the DR will include all of the routes for the logical router, generated as described above.

On the other hand, when the TLR provides stateful services or requires a centralized component for other reasons, the process defines (at 1025) a DR using the received configuration data. For the southbound interfaces of the DR, the management plane uses the southbound interface configurations of the TLR. That is, the IP address and MAC address for each southbound interface are those specified for the ports of the logical router to which the various logical switches couple.

In addition, the process assigns (at 1030) the uplink specified for the TLR to two gateway machines. While some embodiments allow TLRs to operate in active-active mode with multiple uplinks, the process 1000 is for embodiments that restrict the TLRs to a single uplink (also referred to as a router link, as the link interconnects the TLR to another logical router) in active-standby mode. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns the uplink to two of the gateway machines in the selected set.

After assigning the uplinks to gateway machines, the process 1000 defines (at 1035) a SR on each of the two gateway machines. For each SR, the management plane uses the configuration for the single uplink as the configuration for the northbound interface of the SR. As there is only one northbound interface, the process applies the same configuration to both of the SRs. That is, not only is the same IP address used for both northbound interfaces, but the services on the interfaces are configured in the same manner as well. However, different MAC addresses are used for the northbound interfaces, so as to differentiate the active and standby SRs.

The process additionally defines (at 1040) a transit logical switch to connect the defined SRs and DR. In some embodiments, the management plane assigns a unique VNI (logical switch identifier) to the transit logical switch. In addition, some embodiments require that the subnet assigned to the transit logical switch be unique among the logical network topology. As such, the management plane must assign the transit logical switch a subnet different than any of the user-defined logical switches that interface with the TLR, as well as any transit logical switches between the TLR (or other TLRs) and the PLR, as well as all transit logical switches within other TLRs that connect to the same PLR, the transit logical switch within the PLR, and the user-defined logical switches that connect to the other TLRs.

Next, the process assigns (at 1045) a northbound interface to the DR. This interface, in some embodiments, is assigned both a MAC address and an IP address (used for packets sent internally between the components of the TLR). In some embodiments, the IP address is in the same subnet that was assigned to the transit logical switch at 940. The process also assigns (at 1050) southbound interfaces of each of the two SRs. As this is an active-standby configuration, these southbound interfaces have the same IP address, which is in the subnet of the transit logical switch defined at operation 940. Although the two interfaces receive the same IP address, the MAC addresses assigned are different, so as to differentiate the two as destinations for northbound packets routed by the DR.

The process 1000 then assigns (at 1055) one of the SRs as active and one of the SRs as standby. Some embodiments make this determination randomly, while other embodiments attempt to balance the assignment of active and standby SRs across the gateway machines. The SR assigned as active will respond to ARP requests for the southbound (from the DR of this TLR) and northbound (from the DR of the PLR) interfaces. The standby SR, on the other hand, will not respond to ARP requests (so as to avoid receiving northbound or southbound traffic).

Next, the process generates (at 1060) separate RIBs for the DR and for each of the SRs. The separate RIBs are generated based on the configuration data in the manner described in the previous subsections, as well as below in Section IV. In some embodiments, the management plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

Irrespective of whether the TLR is generated with or without SRs, the process 1000 defines (at 1065) another transit logical between the TLR and the PLR to which it connects. This transit logical switch has a unique VNI, and a subnet to which the uplink IP address of the TLR belongs. In addition, an interface on the DR of the PLR is created in the same subnet to connect to the transit logical switch. The process then ends.

It should be understood that while the processes 900 and 1000 illustrate a specific order for performing these various operations, these processes are merely conceptual. In various different embodiments, the management plane may perform the actual operations in various different orders, or even perform some of the operations in parallel. For instance, the management plane could define the transit logical switch first, prior to defining the SR or DR at all, could define all of the logical router components completely before assigning them to separate physical machines, etc.

III. Routing Table Configuration

As indicated above, in some embodiments the management plane receives a logical router configuration and generates (i) one or more logical router constructs for each logical router and (ii) a routing information base (RIB) for each logical router construct. In various different embodiments, the calculation of a forwarding information base (FIB) from the RIB may be performed at the management plane, or by a centralized or local control plane. For instance, in some embodiments, the RIB is distributed to each machine implementing a SR or DR and a local network controller operating on that machine performs the route traversal to calculate the FIB. In this section, the rules for generating the RIBs for the various logical router constructs in some embodiments will be described in greater detail. The routes may come from the connection of logical switches to the logical router, the connection of logical routers to each other, or the input of static routes (received as part of the logical router configuration).

Figure 11:
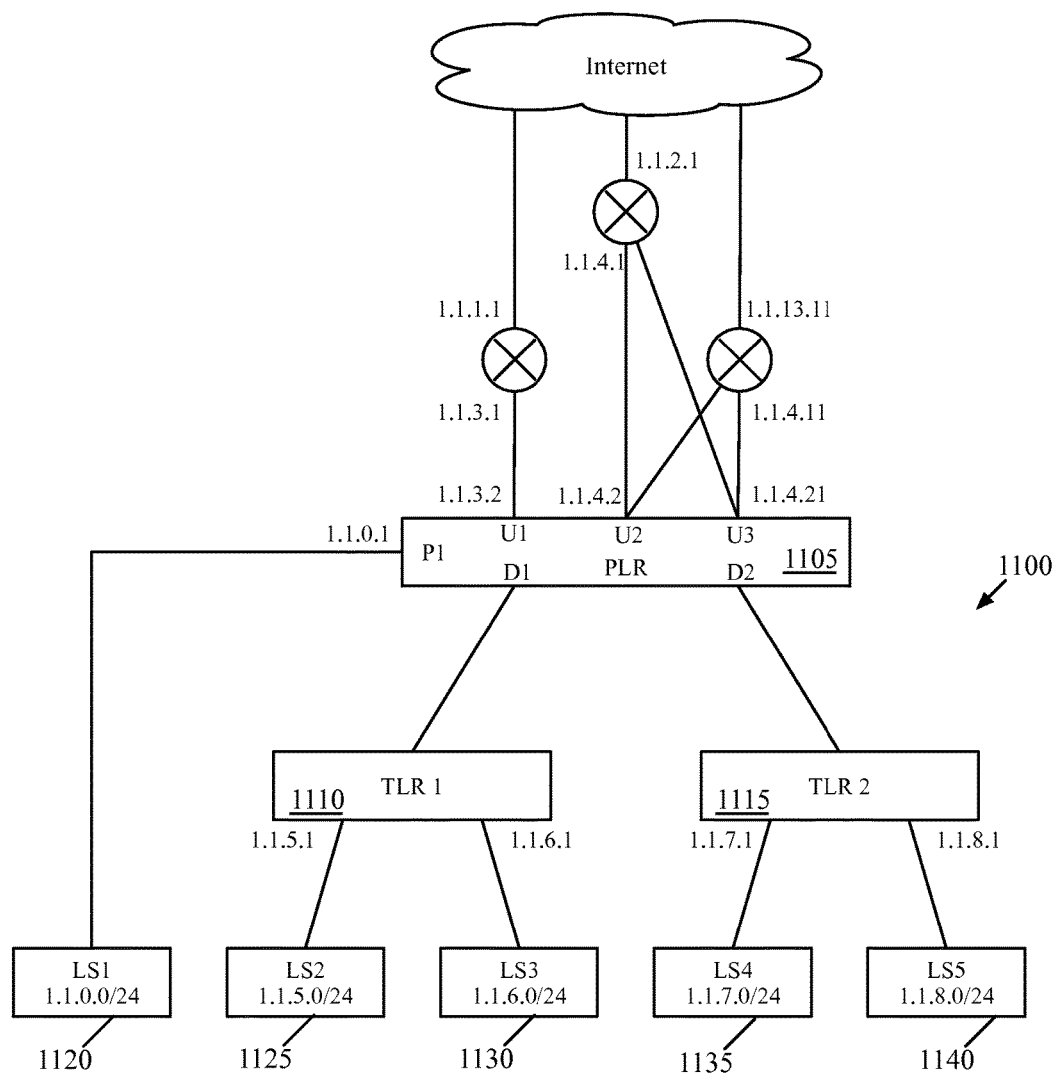
FIG. 11 conceptually illustrates a logical network configuration used to illustrated the RIB generation rules of some embodiments.

FIG. 11 conceptually illustrates a more complex logical network configuration 1100 that will be used to illustrated the RIB generation rules of some embodiments. Specifically, the logical network configuration 1100 includes a PLR 1105 with a logical switch 1120 attached, to which two TLRs 1110 and 1115 also attach. The first TLR 1110 has two logical switches 1125 and 1130 attached, and the second TLR 1115 has two logical switches 1135 and 1140 attached. The PLR 1105 is configured with three uplinks U1-U3, with U1 having an IP address of 1.1.3.2 and being connected to an external physical router port 1.1.3.1. U2 has an IP address of 1.1.4.2, and connects to two external physical routers on the same subnets, with IP addresses of 1.1.4.1 and 1.1.4.11. U3 is on the same subnet with the same L3 connectivity as U2, and has an IP address of 1.1.4.21. The PLR also has three south-facing interfaces, one for the logical switch 1120 (with an IP address of 1.1.0.1, in the subnet of the logical switch 1120 1.1.0.0/24) and one each of D1 and D2 for the TLRs 1110 and 1115. In some embodiments, the user that attaches a TLR to a PLR (i.e., the owner of the TLR) does not configure this interface. Instead, as shown in the subsequent management plane view of FIG. 12.

In some embodiments, the datacenter administrator configures the PLR (i.e., the uplinks and their connectivity), as well as the first logical switch 1120. A first tenant configures the first TLR 1110 as well as its two logical switches 1125 and 1130, while a second tenant independently configures the second TLR 1115, as well as its two logical switches 1135 and 1140. In other embodiments, a single administrator may configure the entire logical network 1100 (e.g., in the case of an enterprise network). When different users configure the different logical routers, some embodiments restrict the subnets available for the various logical switches 1120-1140 to ensure that if the IP addresses are made public (e.g., advertised to the external network via the uplinks U1-U3), different subnets are used for each of the logical switches. Some embodiments allow logical switches to reuse subnets so long as the IP addresses are not advertised externally (including to other TLRs that connect to the same PLR).

Figure 12:
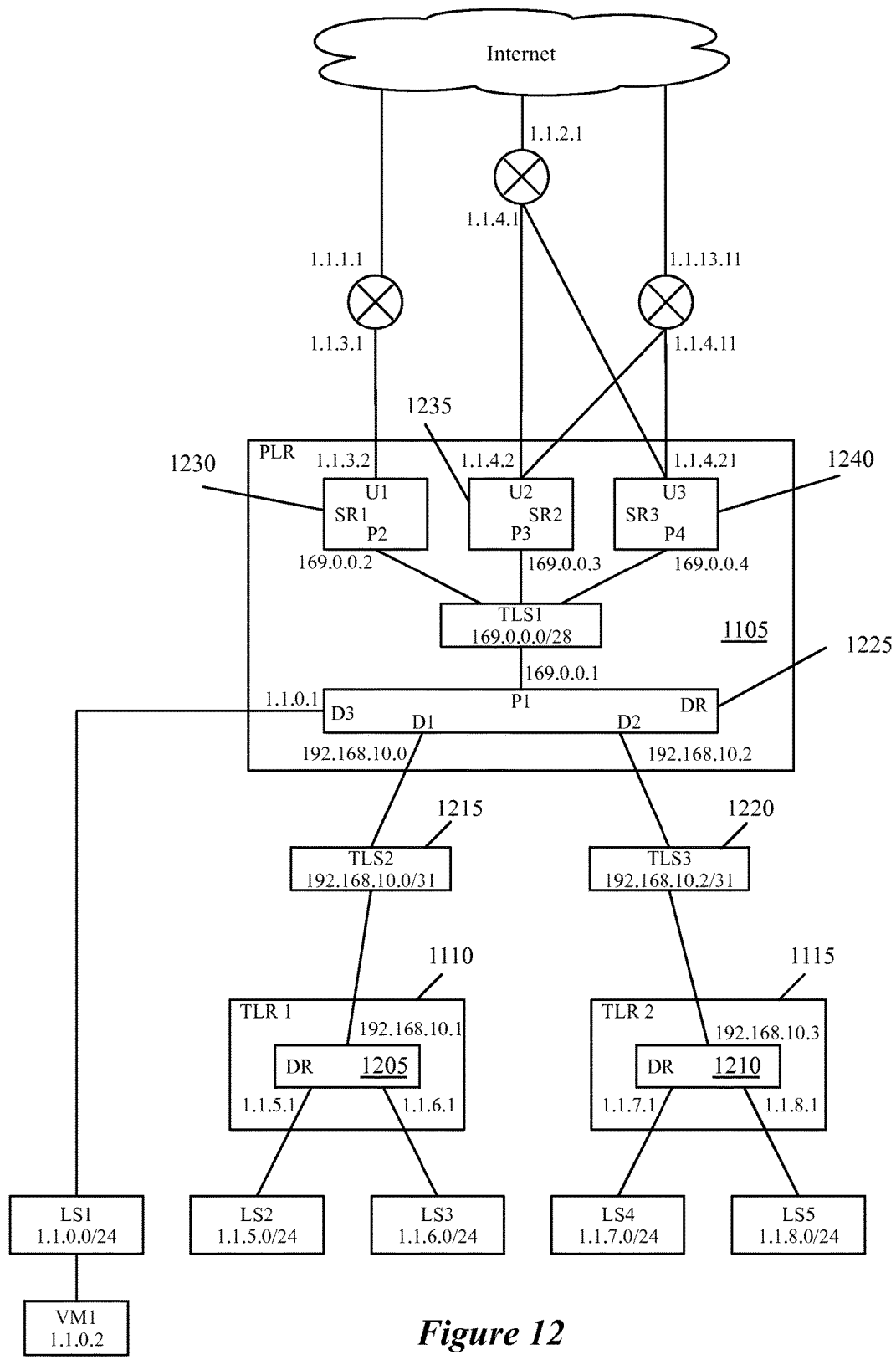
FIG. 12 conceptually illustrates the logical network as generated by the management plane based on the configuration shown in FIG. 11.

FIG. 12 conceptually illustrates the logical network 1100 as generated by the management plane based on the configuration shown in FIG. 11 (as input by a user through the API). In this case, neither of the TLRs 1110 and 1115 include stateful services, and therefore no SRs are required for the TLRs. As described in the previous sections, the TLRs 1110 and 1115 include DRs 1205 and 1210, respectively. The south-facing ports of the TLRs to which the logical switches connect are assigned the same IP addresses (in the subnet of their attached logical switch) as those given to the TLR in the logical network configuration 1100 (e.g., 1.1.5.1, 1.1.6.1, etc.). In addition, for each connection between a TLR and the PLR 1105, the management plane assigns a transit logical switch, and assigns north-facing interface IP addresses on the DRs 1205 and 1210 on these logical switches. In some embodiments, because each of these transit logical switches will only need two addresses, the management plane always assigns/31 subnets from a pool of such subnets, so as to avoid wasting IP address space. In this case, the first transit logical switch 1215 has a subnet of 192.168.10.0/31, while the second transit logical switch 1220 has the next subnet 192.168.10.2/31.

The management plane also defines a DR 1225 and three SRs 1230-1240 (one for each uplink) for the PLR 1105. The DR 1225 has the three south-facing interfaces of the PLR 1105 (as described in the previous section), in addition to a fourth interface P1 defined by the management plane. This interface P1 connects to a transit logical switch 1245 with a subnet of 169.0.0.0/28, to which south-facing interfaces of the three SRs 1230-1240 also connect. These four interfaces P1-P4 have, in turn, IP addresses of 169.0.0.1, 169.0.0.2, 169.0.0.3, and 169.0.0.4.

FIGS. 13, 15, 16, and 17 conceptually illustrate various processes of some embodiments performed by the management plane (e.g., at a centralized network controller) to convert logical router configuration data into RIBs for the DR and SRs of a PLR of some embodiments. Specifically, FIGS. 13 and 15 describe the handling of different types of static routes for the PLR, while FIG. 16 describes handling the connection of a TLR to the PLR and the dynamic routing process that generates routes for the PLR constructs and FIG. 17 describes the creation of a new logical interface on a PLR (either an uplink to the external network or a downlink to a TLR or logical switch). In some embodiments, these processes are performed by the management plane (e.g., a set of modules at a centralized controller that manages the networks of a datacenter). The management plane performs the configuration process, then uses a centralized control plane of the controller (or a different network controller) to distribute the data to various local control planes on the various host machines that implement the logical router constructs. These processes will be described in part by reference to the logical network 1100 shown in FIGS. 11 and 12, as well as the route configuration input and RIB output shown in FIG. 14.

Figure 13:
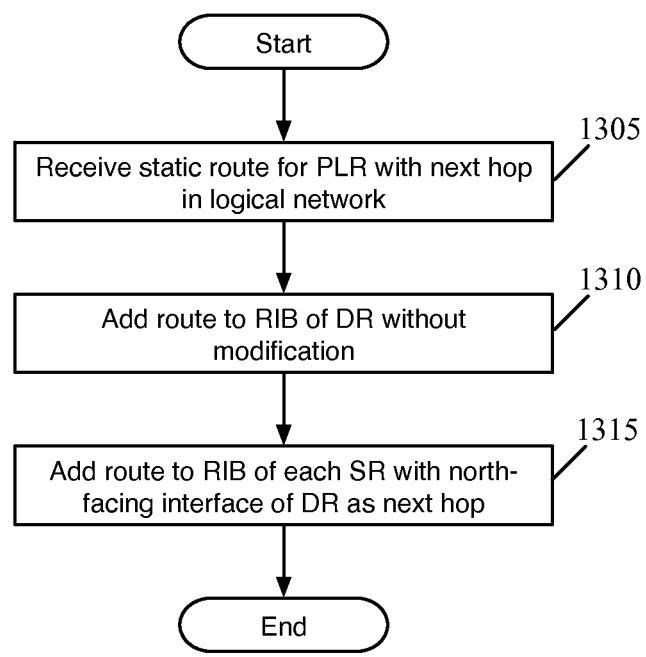
FIG. 13 conceptually illustrates a process of some embodiments for processing south-facing static routes entered as configuration information for a PLR.

FIG. 13 conceptually illustrates a process 1300 of some embodiments for processing south-facing static routes entered as configuration information for a PLR (e.g., for PLR 1105). As shown, the process 1300 begins by receiving (at 1305) a static route with a next hop in the logical network. In some embodiments, static routes are input with a prefix to be routed, a next hop (or gateway) for the route, and in some cases an interface to which to output the route. In use, any packet with a destination IP address that matches the prefix (and does not match a route with a longer prefix) will be output through the given interface to the given next hop address. When the next hop is in one of the subnets of a logical switch attached to the PLR, or that of a logical switch attached to a TLR that attaches to the PLR, then the route is a south-facing route with a next hop in the logical network.

Figure 14:
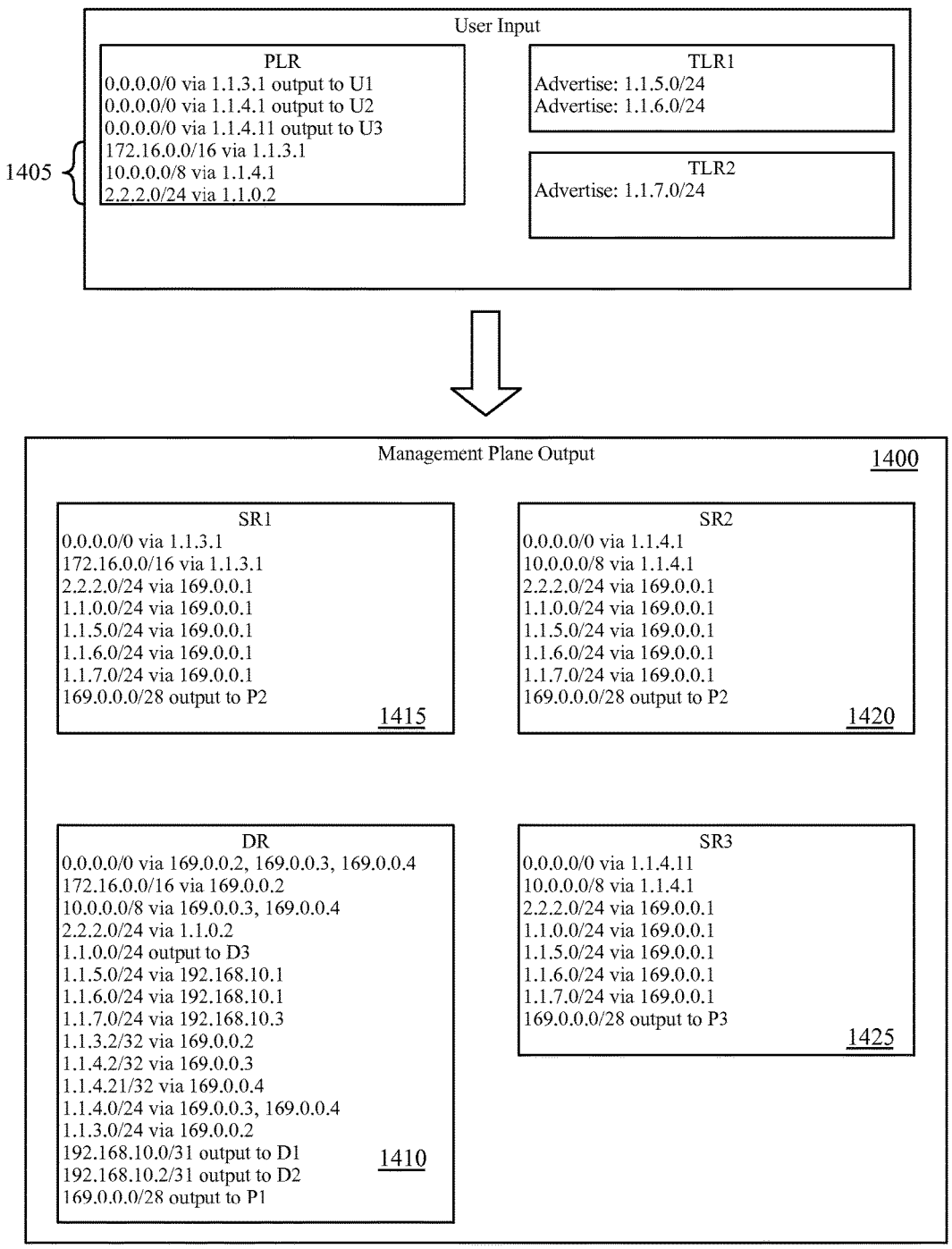
FIG. 14 conceptually illustrates a set of static routes configured for a PLR and configuration for a set of TLRs, as well as the output generated by the management plane for a DR and three SRs of the PLR based on this configuration data.
Figure 16:
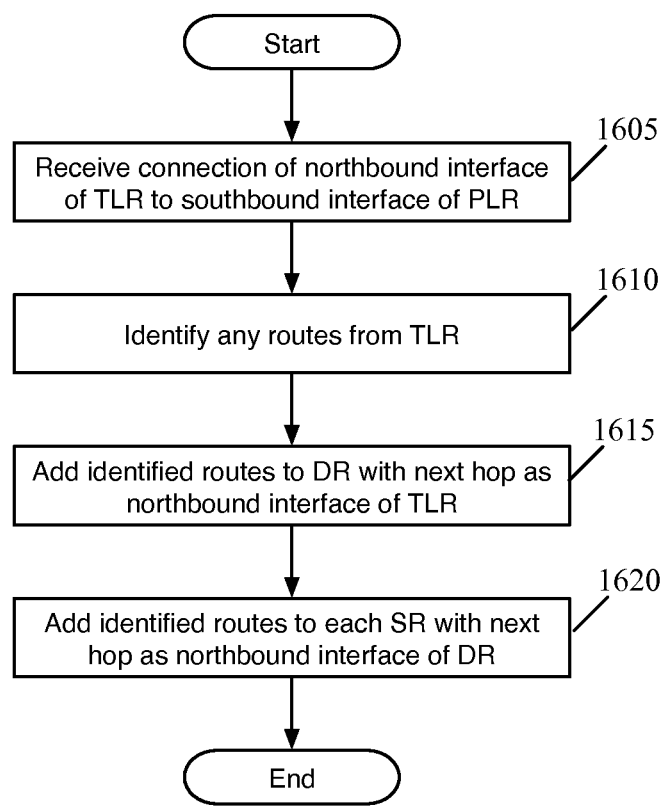
FIG. 16 conceptually illustrates a process of some embodiments for generating the RIB for the PLR routing constructs when a TLR is attached to the PLR.

FIG. 14 conceptually illustrates a set of static routes 1405 configured for the PLR 1205, as well as configuration for the TLRs that will be described below by reference to FIG. 16. This figure also shows the output 1400 generated by the management plane for the DR and the three SRs based on this configuration data. This output includes a RIB 1410 for the DR 1225, as well as RIBs 1415-1425 for the three SRs 1230-1240. As shown, the set of static routes 1405 configured for the PLR includes a south-facing route, specifying all packets with the destination address in the subnet 2.2.2.0/24 to be sent to 1.1.0.2 (2.2.2.0/24 via 1.1.0.2). This address belongs to a VM attached to the logical switch 1120.

Upon receiving such a route, the process 1300 adds (at 1310) the route to the RIB of the DR of the PLR without modification. That is, the next hop of the route as added to the RIB of the DR is the same as the next hop specified in the configuration data. In the example of FIG. 14, the configured route 2.2.2.0/24 via 1.1.0.2 is added to the RIB 1410 for the DR without modification (the fourth route listed in the RIB).

The process 1300 also adds the route to the RIB of each SR with the north-facing interface of the DR as the next hop (and with any output interface removed). That is, a route for the specified prefix is added to each of the SRs (to handle packets sent to the specified IP address from the external physical network), with the next hop being that of the DR interface that connects to the same transit logical switch as the south-facing interfaces of the SRs. In the logical network 1100, this is the interface P1, with an IP address of 169.0.0.1. As such, the RIBs 1415-1425 each have a route 2.2.2.0/24 via 169.0.0.1. After adding routes to the RIBs of each of the logical router constructs for the PLR, the process 1300 ends. In some embodiments, so long as the SR has the ability to deduce recursive routes, the management plane adds south-facing static routes to the RIB of the SR without modification, rather than modifying the route. In such embodiments, the management plane in this example would add the route 2.2.2.0/24 via 1.1.0.2, recognizing that the route 1.1.0.0/24 via 169.0.0.1 would result in the correct outcome in the FIB of the SR once the routes were traversed.

Figure 15:
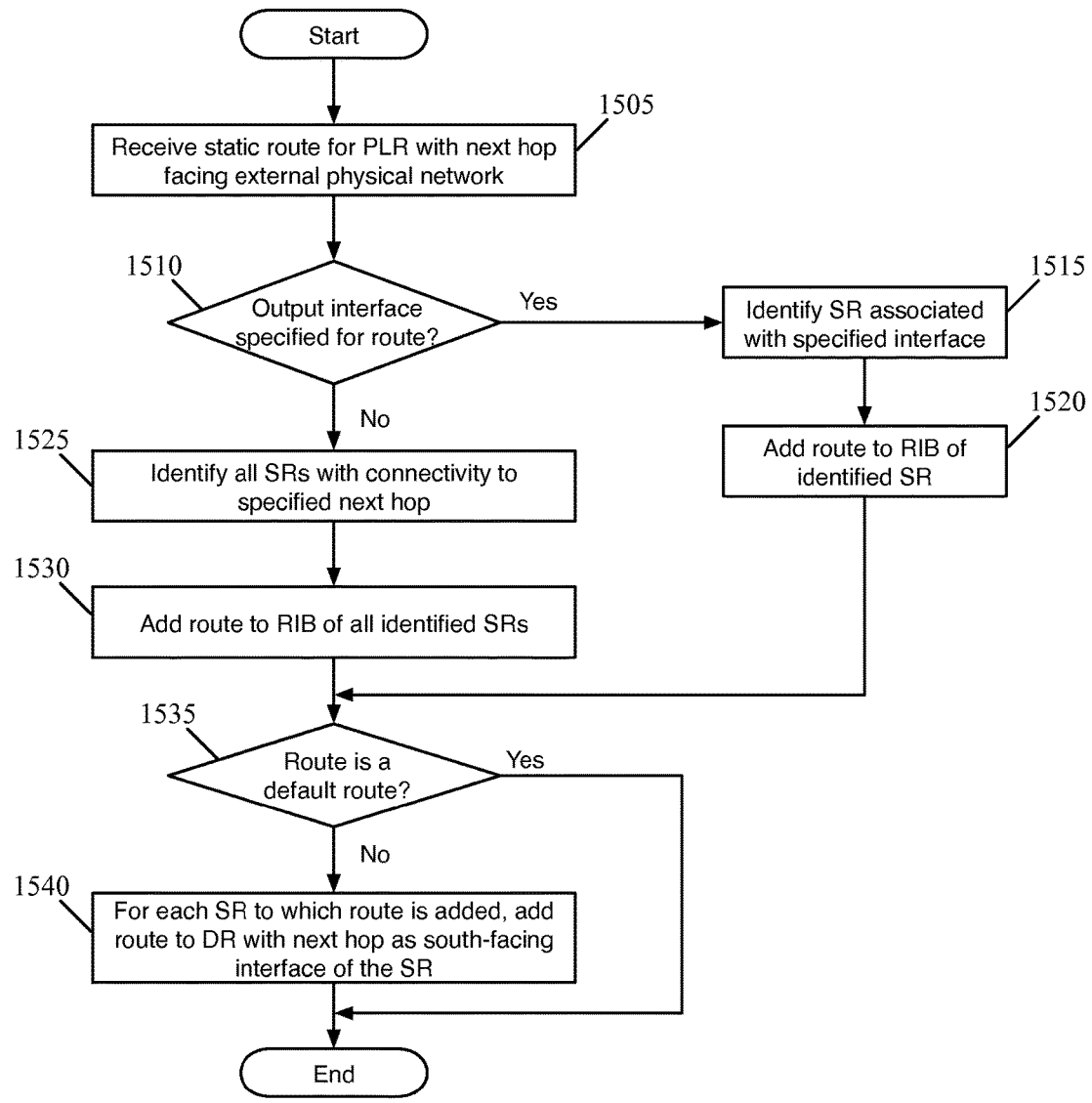
FIG. 15 conceptually illustrates a process of some embodiments for processing north-facing routes entered as configuration information for a PLR.

Whereas the process 1300 is used to handle south-facing static routes, FIG. 15 conceptually illustrates a process 1500 of some embodiments for processing north-facing routes entered as configuration information for a PLR (e.g., for the PLR 1105). In some embodiments, the process 1300 and 1500 are actually part of a single software process, with the different operations performed depending on a decision made by the process as to whether the route was south-facing or north-facing.

As shown, the process 1500 begins by receiving (at 1505) a static route with a next hop facing the external physical network. In this case, when the next hop is that of a physical router that provides connectivity for the logical network to the external physical network, then the route is a north-facing route with a next hop facing the external physical network. The set of static routes 1405 configured for the PLR includes a number of north-facing routes, including three different routes for the prefix 0.0.0.0/0 (i.e., default routes), a route for 172.16.0.0/16, and a route for 10.0.0.0/8. Each of these routes specifies a next hop belonging to an external router (i.e., one of 1.1.3.1, 1.1.4.1, and 1.1.4.11).

The process then determines (at 1510) whether an output interface is specified for the route. As mentioned above, in some embodiments, the configured static routes include a next hop address and, in some cases, an interface of the logical router through which to output packets with destination addresses in the subnet being routed. As far as the routes shown in the PLR configuration data 1405, the three default routes (for 0.0.0.0/0) specify output interfaces. Specifically, these routes indicate next hop physical routers for each of the three north-facing interfaces U1, U2, and U3.

When the route specifies an output interface, the process identifies (at 1515) the SR associated with the specified interface. In some embodiments, as described in the previous section, a different SR is assigned for each of the uplinks of a PLR. For instance, in the example logical network 1100, the uplinks U1, U2, and U3 of the PLR 1105 are assigned to the three SRs 1230, 1235, and 1240 respectively.

The process 1500 then adds (at 1520) the route to the RIB of the identified SR. The route is not added to any of the other SRs, as northbound packets that will be processed by the route should not be sent to the other SRs. Thus, in the FIG. 14 example, the route 0.0.0.0/0 via 1.1.3.1 output to U1 is only added to the RIB 1415 for the first SR 1230, which owns the output interface U1. Similarly, the route 0.0.0.0/0 via 1.1.4.1 output to U2 is only added to the RIB 1420 for the second SR 1235, and the route 0.0.0.0/0 via 1.1.4.11 output to U3 is only added to the RIB 1420 for the third SR 1240.

On the other hand, if the route does not specify an output interface, the process identifies (at 1525) all SRs with connectivity to the specified next hop. In the case that all of the SRs have equivalent L3 connectivity (e.g., all uplinks are connected to the same set of physical routers), then this will be all of the SRs. In some cases, however, the administrator may configure the PLR uplinks with different L3 connectivity, in which case some of the SRs may not have connectivity to the next hop for a particular route.

The process then adds (at 1530) the route to the RIB for each of the identified SRs. The PLR configuration 1405 includes two static routes without output interfaces specified. The first such route is for the prefix 172.16.0.0/16 with a next hop address of 1.1.3.1. In this case, only the first SR 1230 has connectivity to the next hop, so the management plane adds this route to only the RIB 1415 for this first SR. The route is not added to the RIBs 1420 or 1425. The other route is for the prefix 10.0.0.0/8 with a next hop of 1.1.4.1. Two of the uplinks (U2 and U3) have connectivity to this next hop, so the route is added to the RIBs 1420 and 1425 of their respective SRs 1235 and 1240, and not added to the RIB 1415.

In addition to adding the route to one or more of the SRs, the process 1500 also adds the route to the DR in some cases. Specifically, the process determines (at 1535) whether the route is a default route. A default route, in some embodiments, is a route for the prefix 0.0.0.0/0 (i.e., the entire IPv4 address space). In a longest prefix matching system, such routes are used only when a packet does not match any other routes in a routing table. If the end machines of the logical network (e.g., VMs) are acting as servers for remote clients that access the machines through the Internet, then the default routes will often be used for return communications.

When the route is a default route, the process 1500 does not add the route to the DR at all, and ends. As such, in the example, the three default routes are not added to the DR. However, in some embodiments, as part of the configuration to generate multiple logical router constructs for the PLR, the management plane always adds a default route to the DR, that sends packets not otherwise matched to any of the SRs (e.g., using ECMP principles). Thus, the RIB 1410 for the DR 1225 includes a default route 0.0.0.0/0 via 169.0.0.2, 169.0.0.3, 169.0.0.4 (the addresses for the south-facing interfaces P2-P4 of the three SRs). This route sends packets to any one of the three SRs.

For non-default static routes, the process adds (at 1540) a route to the DR for each SR to which the route was added, with the south-facing interface of the SR as the next hop. The process 1500 then ends. For instance, the route 172.16.0.0/16 via 1.1.3.1 was only added to the RIB 1415 for the first SR 1230. As such, this route is added to the RIB 1410 for the DR 1225 as 172.16.0.0/16 via 169.0.0.2 (the address of P2, the south-facing interface of the first SR 1230). The route 10.0.0.0/8 via 1.1.4.1, on the other hand, was added to the RIBs 1420 and 1425. As such, the management plane adds a route with two next hops to the RIB 1410 for the DR, as 10.0.0.0/8 via 169.0.0.3, 169.0.0.4. For instance, then, a packet with a destination IP address of 10.0.1.1 will be sent to either of the SRs 1235 and 1240, depending on how the ECMP principles are applied by the DR implementation.

As can be seen in FIG. 14, the RIBs for the various logical router constructs for a logical router will include other routes in addition to the static routes. These routes include connected routes the various logical switches connected to the router construct. For instance, the DR 1225 is connected to four logical switches: three transit logical switches 1215, 1220, and 1245, as well as the user-created logical switch 1120. For each of these, a route is added to the DR with an output interface (rather than a next hop). Thus, the RIB 1410 includes the routes 1.1.0.0 output to D3 (for the user-created logical switch), 192.168.10.0/31 output to D1 and 192.168.10.2/31 output to D2 (for the transit logical switches between the PLR and the TLRs), and 169.0.0.0/28 output to P1 (for the transit logical switch internal to the PLR). In some embodiments, the SRs have connected routes for the transit logical switch internal to the PLR (e.g., 169.0.0.0/28 output to P2 for the same RIB 1415). However, the SRs may not have connected routes for their external L2 connectivity in some embodiments, as in this example. Other embodiments, however, do include such connected routes (e.g., 1.1.3.0/24 output to U1 for the RIB 1415 of the first SR 1230, and 1.1.4.0/24 output to U2/U3 for the RIBs 1420 and 1425 of the other two SRs 1235 and 1240) when this L2 connectivity is configured by the administrator. Furthermore, for each uplink interface IP (e.g., 1.1.3.2, 1.1.4.2, and 1.1.4.21), some embodiments automatically insert routes for these specific "/32" IP addresses into the DR with the next hop being the southbound interface of the corresponding SR (i.e., 1.1.3.2/32 via 169.0.0.2, 1.1.4.2/32 via 169.0.0.3, and 1.1.4.21/32 via 169.0.0.4). Some embodiments, as shown, also insert routes for the subnets to which the uplinks are connected into the RIB of the DR, with the next hop again being the southbound interface of the corresponding SR (i.e., 1.1.3.0/24 via 169.0.0.2 and 1.1.4.0/24 via 169.0.0.3, 169.0.0.4)

In addition, the logical routing constructs of the PLR may include routes that are dynamically generated by the management plane based on the connection of other logical routers (e.g., the TLRs). FIG. 16 conceptually illustrates a process 1600 of some embodiments for generating the RIB for the PLR routing constructs when a TLR is attached to the PLR. Because the logical router configuration information is known to the management plane (e.g., a set of network controllers), some embodiments are able to avoid running BGP or a similar dynamic routing protocol to exchange routes within the logical network (as described above, BGP/OSPF may still be used to advertise routes to the external physical network.

As shown, the process 1600 begins by receiving (at 1605) the connection of a northbound interface of a TLR to a southbound interface of a PLR. In some embodiments, the owner of the TLR (e.g., a datacenter tenant) enters this as configuration data through the management plane API. The tenant may not need the interface information for the PLR to specify such a connection. Instead, the tenant requests to connect the TLR, and the management plane automatically creates the transit logical switch between them (from, e.g., a pool of available subnets), as well as the TLR northbound interface and the PLR southbound interface (ensuring that these interfaces have IP addresses in the subnet assigned to the transit logical switch). In the logical network 1100 of FIG. 11, users have attached the TLRs 1110 and 1115 to the PLR 1105 (possibly as separate actions).

The process then identifies (at 1610) any routes from the attached TLR. The TLR will have connected routes for each of its logical switches. In addition, the TLR may also include static routes configured by the user in some embodiments. However, in other embodiments, the TLR users either may not configure static routes, or the static routes are not propagated to the PLR via dynamic routing (as, e.g., different tenants might configure different routes for the same address). In addition, in some embodiments, the tenant may specify whether their logical switch subnets should be advertised (i.e., whether these subnets will communicate outside the TLR (either with machines south of other TLRs or with machines external to the logical network). In the example of FIG. 14, the first TLR 1110 advertises both of its subnets 1.1.5.0/24 and 1.1.6.0/24, whereas the second TLR 1115 advertises only one of its two subnets, 1.1.7.0/24 (and does not advertise 1.1.8.0/24).

The process 1600 then propagates these routes into the DR and the SRs. As shown, the process adds (at 1615) the identified routes to the DR (of the PLR) with the next hop as the northbound interface of the TLR. In the example, the TLRs 1110 and 1115 are entirely distributed, so these northbound interfaces belong to the DRs 1205 and 1210 of the TLRs. Thus, the RIB 1410 of the PLR's DR 1225 includes routes for 1.1.5.0 and 1.1.6.0 with the next hop address of 192.168.10.1 (the northbound interface of the DR 1215), as well as a route for 1.1.7.0 with a next hop address of 192.168.10.3 (the northbound interface of the DR 1210). If the TLR includes stateful services, then the northbound interface of the SRs will have the same IP address (in active-standby mode), and this will be the next hop IP address used for the routes in the DR of the PLR.

The process also adds (at 1620) the identified routes to each SR (of the PLR), using the northbound interface of the DR (of the PLR) as the next hop IP address. The process then ends. In the example, each of the RIBs 1415-1425 includes routes for 1.1.5.0, 1.1.6.0, and 1.1.7.0, all with the next hop IP address of 169.0.0.1 (i.e., the address of P1). Thus, for each of these subnets, packets received from the external network with destination addresses in the subnets will be sent from the receiving SR to the DR and subsequently from the DR to the appropriate TLR.

Figure 17:
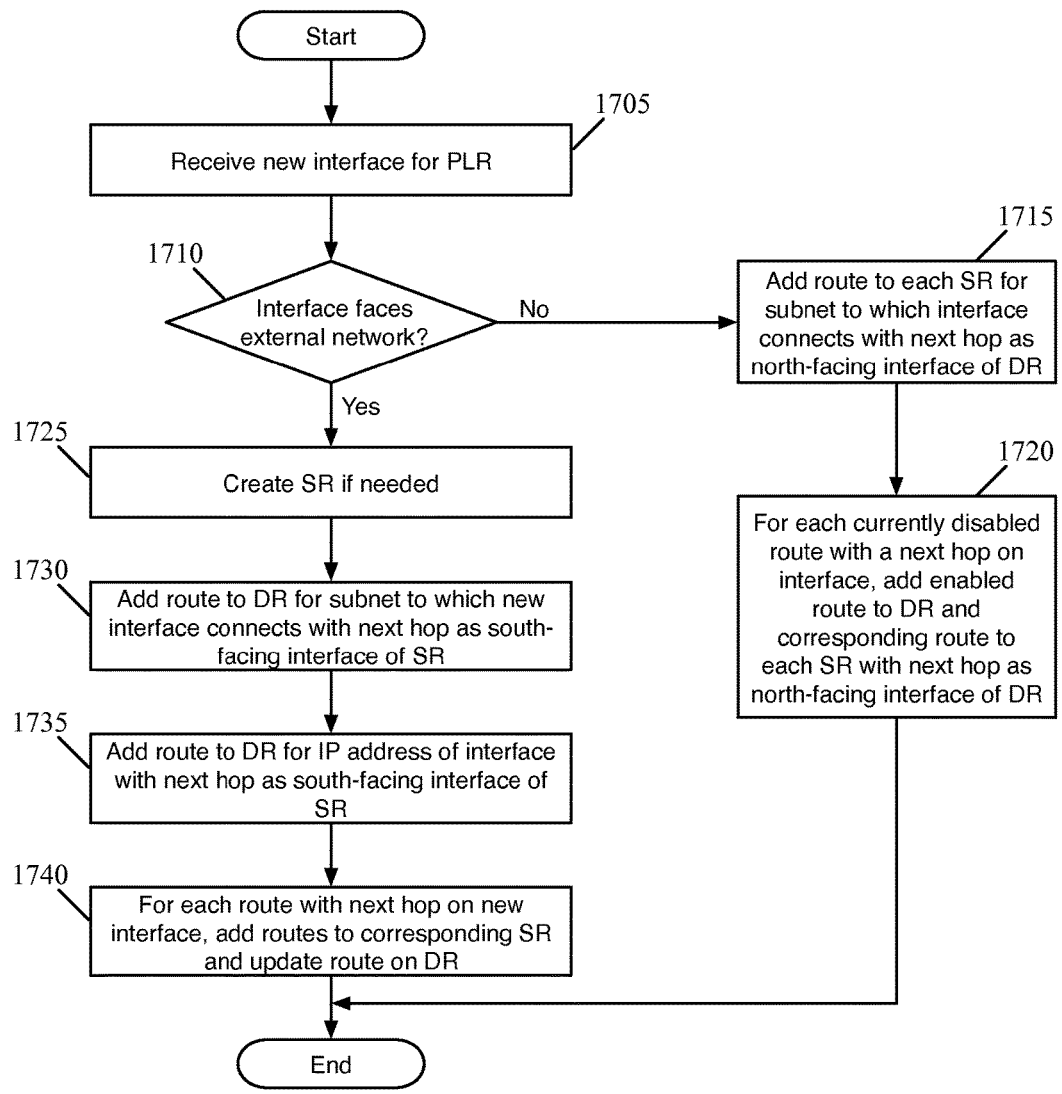
FIG. 17 conceptually illustrates a process of some embodiments for generating routes for the RIB of the PLR routing constructs when a new interface is added to the PLR.

FIG. 17, as mentioned, conceptually illustrates a process 1700 of some embodiments for generating routes for the RIB of the PLR routing constructs when a new interface is added to the PLR. Specifically, this process refers to the connected routes and other routes internal to the PLR (as opposed to the dynamic routes added by the process 1600 for a TLR connection). This new interface could be a new uplink or a downlink (i.e., a logical switch or a connection to a TLR).

As shown, the process begins by receiving (at 1705) a new interface for the PLR. In some embodiments, the owner of the PLR enters this as configuration data through the management plane API. In additions, some embodiments automatically create a downlink when a new TLR requests to connect to the PLR. The process then determines (at 1710) whether the interface faces an external network (i.e., whether the interface is an uplink (facing the external network) or a downlink (facing a logical switch or the transit logical switch for a TLR connection).

When the interface is a downlink, the process adds (at 1715) a route to each SR of the PLR a route for the subnet to which the interface connects with the next hop as the north-facing interface of the DR (in addition to, of course, a connected route for the interface itself to the DR). Thus, in the example of FIG. 14, each of the SR RIBs 1415-1425 includes a route for 1.1.0.0/24 (the subnet of logical switch LS1) with a next hop of 169.0.0.1 (the north-facing interface of the DR 1225).

In addition, the creation of the downlink may allow the management plane to enable static routes that were previously disabled. In some embodiments, static routes that point to an interface that does not exist will be stored for the logical router, but disabled (and thus not added as routes to the RIBs of the various logical router constructs). When the interface is subsequently created, the process 1700 adds (at 1720), for each such currently disabled route, (i) the route to the RIB of the DR and (ii) corresponding routes to the RIB of each of the SRs with the next hop as the north-facing interface of the DR.

On the other hand, when the new interface is an uplink (i.e., it faces the external network), the process 1700 creates (at 1725) a new SR if needed for the uplink, as described above. The process also adds (at 1730) a route to the DR for the subnet to which the new interface connects with the next hop as the south-facing interface of the SR. The process also adds (at 1735) a route to the DR for the IP address of the new uplink interface with the next hop also as the south-facing interface of the SR. For example, in FIG. 14, the DR has routes for each of the interfaces 1.1.3.2 via 169.0.0.2, 1.1.4.2 via 169.0.0.3, and 1.1.4.21 via 169.0.0.4. In addition, in some embodiments, the DR would have similar routes for the subnets to which each of these interfaces connect.

Finally, for each route with a next hop on the new interface (e.g., static routes pointing to external routers), the process adds (at 1740) the routes to the SR for the new interface, and updates the route on the DR. For example, a default route on the DR would be created to also point to the south-facing interface of the new SR (having equal priority to the default routes pointing to the other SRs), and any static route for external networks that points to an external physical router interface reachable via the new interface would have the corresponding routes added to the SR and DR (e.g., according to the process 1500).

In some situations, the configuration data may change, resulting in the management plane modifying the RIBs of the various logical router constructs. For instance, if a TLR uplink IP address changes (because, e.g., the pool of available subnets for transit logical switches is modified), then the management plane will have to modify the DR routes with next hops in this subnet. In some embodiments, these are any routes based on advertised subnets from the TLR (e.g., the route 1.1.5.0 via 192.168.10.1 in the above example) as well as the connected route for the now-modified interface (e.g., the route 192.168.10.0/31 output to D1 in the above example). Similarly, if the internal transit logical switch for a logical router changes, then the connected routes on the various logical router constructs for that network will be modified, and the internal routes between the DR and the SRs will be modified (if the north-facing DR interface and the south-facing SR interfaces are modified as a result of this change).

In addition, an administrator might modify the IP address of a PLR port. When this modified port is a downlink (e.g., connecting to a logical switch, such as the logical switch 1120 in the example), the connected route for that logical switch will be automatically modified. However, if any static routes with a next hop in the network exist, some embodiments do not allow the configuration modification. Other embodiments instead invalidate the static route while allowing the configuration change.

If the modified PLR port is an uplink, then none of the auto-generated routes in the RIBs need to be modified (unless connected routes are used for the external L2 connectivity, and this connectivity is changed). However, the BGP peering with the external network may need to be modified, as the next hop IP address for routes advertised to the external routers will need to be changed. Additionally, static routes configured on the PLR could be sent to new sets of SRs. If, for example, the first SR 1230 was modified to have an address of 1.1.4.4, and connected to the second and third external routers (addresses of 1.1.4.1 and 1.1.4.11), then this would create a problem for the static route 172.16.0.0/16 via 1.1.3.1 (either this configuration changed would not be allowed or the static route would be invalidated), while the static route 10.0.0.0/8 via 1.1.4.1 would also be added to the RIB 1415 for the first SR 1230.

During operation, an administrator may add or delete uplinks (and corresponding SRs). When an uplink is added, the management plane adds routes to the DR and the new SR as described in the manner above (e.g., adding a default equal-cost route to the DR, and adding any routes based on logical switches connected to the PLR or logical switches from connected TLRs that are selected for route advertisement). Furthermore, in some embodiments the static routes configured for the PLR may need to be added to the RIB of the new SR, depending on the uplink L3 connectivity (in the same manner as described above). When an uplink (and SR) is deleted, in some embodiments the management plane first validates that no interface-based routes are configured for the PLR that will be affected by the removal of the SR and uplink (e.g., routes specifying the uplink as the output-interface). Furthermore, the equal-cost default route to send packets to the SR is removed from the DR, the port on the internal transit logical switch is deleted, and any static routes that resulted in DR routes pointing to the SR are also removed from the DR.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
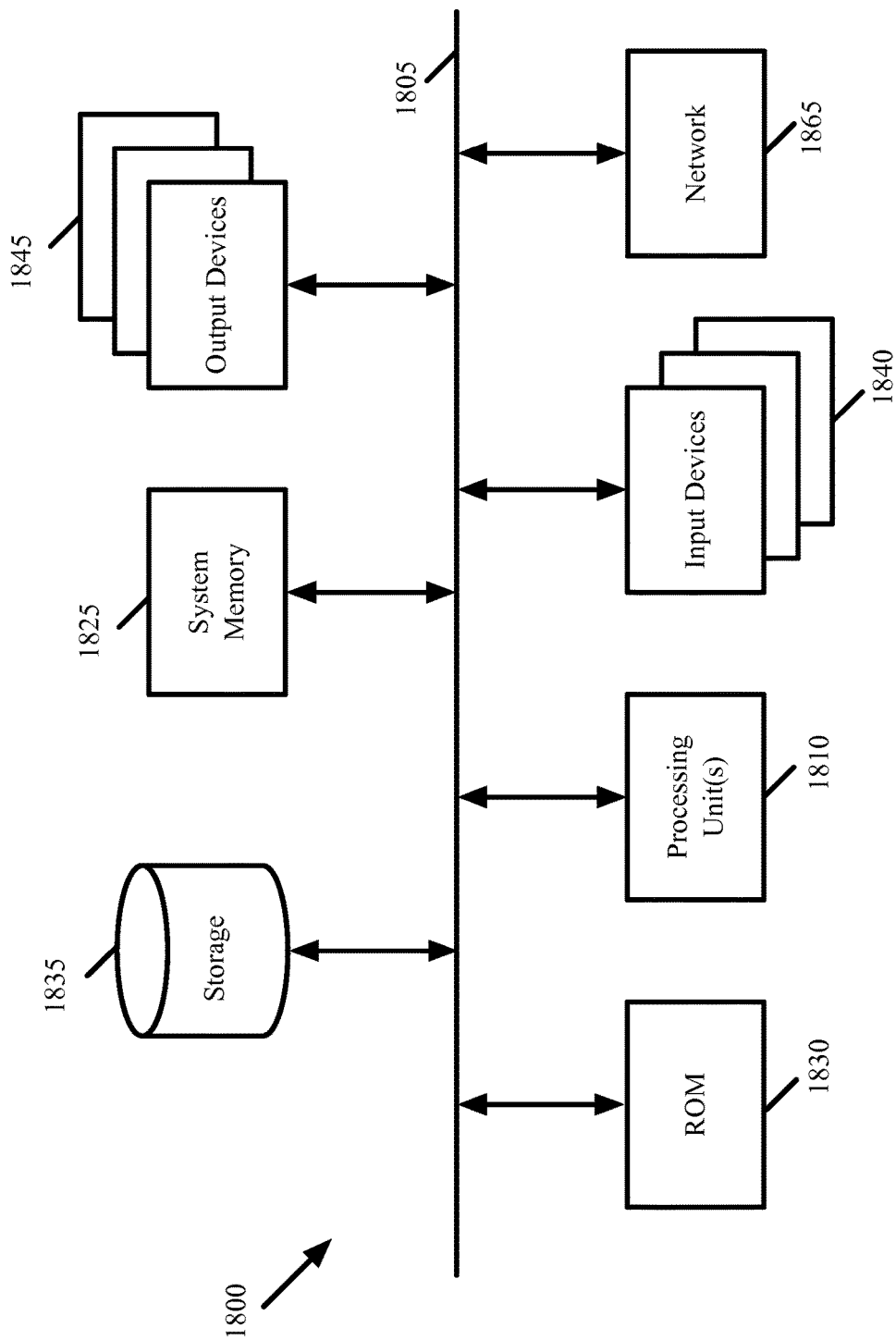
FIG. 18 conceptually illustrates an electronic system with which some embodiments of the invention are implemented.

FIG. 18 conceptually illustrates an electronic system 1800 with which some embodiments of the invention are implemented. The electronic system 1800 can be used to execute any of the control, virtualization, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1825, and the permanent storage device 1835.

From these various memory units, the processing unit(s) 1810 retrieve instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various memory units, the processing unit(s) 1810 retrieve instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 10, 13, 15, 16, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for implementing a logical router in a logical network, the method comprising:
   receiving a configuration of a static route for the logical router, wherein the logical router comprises (i) a distributed routing component that interfaces with other logical forwarding elements to process data traffic internal to the logical network and (ii) one or more centralized routing components that interface with an external physical network to process data traffic between the logical network and the external physical network, wherein the distributed routing component and each of the centralized routing components have separate routing tables, wherein the distributed routing component is implemented across a plurality of physical machines that implement the logical network;
   identifying which of the centralized routing components require addition of a route to a corresponding routing table to implement the configuration of the static route; and
   adding routes for a same prefix as the configured static route to (i) each of the corresponding separate routing tables of the identified centralized routing components and (ii) the routing table of the distributed routing component.

2. The method of claim 1, wherein the configuration of the static route comprises the prefix and a next hop address.

3. The method of claim 2, wherein the configuration of the static route further comprises an output interface.

4. The method of claim 1, wherein the static route includes a next hop address that is an address in the logical network, wherein the distributed routing component and each of the centralized routing components of the logical router are identified as requiring addition of a route to a corresponding routing table.

5. A method for implementing a logical router in a logical network, the method comprising:
   for the logical router, receiving a configuration of a static route including a next hop address that is an address in the logical network, wherein the logical router comprises (i) a distributed routing component that interfaces with other logical forwarding elements and (ii) one or more centralized routing components that interface with an external physical network, wherein the distributed routing component and each of the centralized routing components have separate routing tables, wherein the distributed routing component is implemented across a plurality of physical machines that implement the logical network;
   determining that the static route should be added to the routing table of the distributed routing component and each of the centralized routing components;
   adding the static route as configured to the distributed routing component; and
   adding routes for a same prefix as the configured static route to each of the centralized routing components, the routes including a next hop address of an interface of the distributed routing component to which the centralized routing components connect.

6. The method of claim 5, wherein the configuration of the static route further comprises an output interface.

7. The method of claim 5, wherein the distributed routing component interfaces with the other logical forwarding elements to process data traffic internal to the logical network, and wherein the centralized routing components interface with the external physical network to process data traffic between the logical network and the external physical network.

8. A method for implementing a logical router in a logical network, the method comprising:
   for the logical router, receiving a configuration of a static route including a next hop address that is an address in the external physical network, wherein no output interface is specified for the static route, wherein the logical router comprises (i) a distributed routing component that interfaces with other logical forwarding elements and (ii) one or more centralized routing components that interface with an external physical network, wherein the distributed routing component and each of the centralized routing components have separate routing tables, wherein the distributed routing component is implemented across a plurality of physical machines that implement the logical network;
   identifying the centralized routing components with connectivity to the next hop address; and
   adding the static route as configured to the routing table of each identified centralized routing components with connectivity to the next hop address;
   based on a determination that the configured static route is not a default route, adding routes to the to the routing table of the distributed routing component, the next hop address for each added route being an address of an interface of the centralized routing components to which the configured static route was added.

9. The method of claim 8, wherein the method is performed by a centralized network controller that manages the logical router.

10. The method of claim 9 further comprising distributing the routing tables with the added routes to local network controllers operating on the plurality of physical machines that implement the distributed routing component.

11. The method of claim 8, wherein adding a route to a particular routing table comprises adding or modifying an entry of the particular routing table.

12. A non-transitory machine readable medium storing a program which when executed by at least one processing unit implements a logical router in a logical network, the program comprising sets of instructions for:
   receiving a configuration of a static route for the logical router, wherein the logical router comprises (i) a distributed routing component that interfaces with other logical forwarding elements to process data traffic internal to the logical network and (ii) one or more centralized routing components that interface with an external physical network to process data traffic between the logical network and the external physical network, wherein the distributed routing component and each of the centralized routing components have separate routing tables, wherein the distributed routing component is implemented across a plurality of physical machines that implement the logical network;
   identifying which of the centralized routing components require addition of a route to a corresponding routing table to implement the configuration of the static route; and
   adding routes for a same prefix as the configured static route to (i) each of the corresponding separate routing tables of the identified centralized routing components and (ii) the routing table of the distributed routing component.

13. The non-transitory machine readable medium of claim 12, wherein the configuration of the static route comprises the prefix and a next hop address.

14. The non-transitory machine readable medium of claim 13, wherein the configuration of the static route further comprises an output interface.

15. The non-transitory machine readable medium of claim 12, wherein (i) the static route includes a next hop address that is an address in the logical network, (ii) the distributed routing component and each of the centralized routing components of the logical router are identified as requiring addition of a route to a corresponding routing table, and (iii) the set of instructions for adding routes for the same prefix as the configured static route to the separate routing tables for the distributed routing component and each of the identified centralized routing components comprises sets of instructions for:
   adding the static route as configured to the distributed routing component; and
   adding routes for the same prefix as the configured static route to each of the centralized routing components, the routes including a next hop address of an interface of the distributed routing component to which the centralized routing components connect.

16. The non-transitory machine readable medium of claim 12, wherein (i) the static route includes a next hop address that is an address in the external physical network, (ii) no output interface is specified for the static route, (iii) the set of instructions for identifying which of the centralized routing components require addition of a route to the corresponding routing table comprises a set of instructions for identifying centralized routing components with connectivity to the next hop address, and (iv) the set of instructions for adding routes to the corresponding routing tables for the identified centralized routing components comprises a set of instructions for adding the static route as configured to the corresponding separate routing tables of each of the identified centralized routing components with connectivity to the next hop address.

17. The non-transitory machine readable medium of claim 16, wherein:
   the set of instructions for identifying which of the routing components require addition of a route to the corresponding routing table further comprises a set of instructions for determining whether the configured static route is a default route; and
   the set of instructions for adding routes to the corresponding routing tables of the identified routing components comprises a set of instructions for adding routes for the same prefix as the configured static route to the routing table of the distributed routing component based on a determination that the configured static route is not a default route, the next hop address for each added route being an address of an interface of the centralized routing component to which the configured static route was added.

18. The non-transitory machine readable medium of claim 12, wherein the program is a centralized network controller that manages the logical router, the program further comprising a set of instructions for distributing the routing tables with the added routes to local network controllers operating on the plurality of physical machines that implement the distributed routing component.

19. The non-transitory machine readable medium of claim 12, wherein the set of instructions for adding a route to a particular routing table comprises a set of instructions for adding or modifying an entry of the particular routing table.

* * * * *